United States Patent [19]
Akiyama et al.

[11] Patent Number: 5,187,935
[45] Date of Patent: Feb. 23, 1993

[54] ENGINE CONTROL DEVICE

[75] Inventors: Eitetsu Akiyama; Noriyuki Kishi, both of Saitama, Japan

[73] Assignee: Honda Giken Kogyo Kabushiki Kaisha, Tokyo, Japan

[21] Appl. No.: 839,063

[22] Filed: Feb. 19, 1992

Related U.S. Application Data

[63] Continuation of Ser. No. 457,233, Dec. 26, 1989, abandoned.

[30] Foreign Application Priority Data

Dec. 26, 1988 [JP] Japan .................. 63-328551

[51] Int. Cl.⁵ .............................. F02D 23/00
[52] U.S. Cl. ...................... 60/602; 60/600; 60/601; 60/603
[58] Field of Search .............. 60/600, 601, 602, 603, 60/611; 123/564

[56] References Cited

U.S. PATENT DOCUMENTS

| | | | |
|---|---|---|---|
| 4,473,055 | 9/1984 | Ito et al. | 60/600 |
| 4,763,477 | 8/1988 | Sasaki et al. | 60/602 |
| 4,848,086 | 7/1989 | Inoue et al. | 123/564 |

FOREIGN PATENT DOCUMENTS

| | | | |
|---|---|---|---|
| 5828561 | 7/1981 | Japan | 60/603 |
| 62282128 | 5/1986 | Japan | |
| 6316111 | 7/1986 | Japan | |

Primary Examiner—John J. Vrablik
Assistant Examiner—Alfred Basichas
Attorney, Agent, or Firm—Lyon & Lyon

[57] ABSTRACT

An engine control system comprising a variable valve actuating mechanism for an engine which may consists of a mechanism capable of varying valve timing, a variable capacity supercharger which may consists of a turbocharger provided with moveable vanes for varying a cross sectional area of an exhaust gas passage leading to a turbine wheel, and a control unit for controlling a valve actuating operation of the valve actuating mechanism and a capacity varying operation of the variable capacity supercharger. The capacity of the supercharger is controlled by taking into account the operating conditions of the valve actuating mechanism. Thus, the control unit is capable of achieving a precise and prompt control action, and, by appropriately determining the control plan, it is possible to increase the maximum output of the engine and/or to reduce strain on the engine.

7 Claims, 14 Drawing Sheets

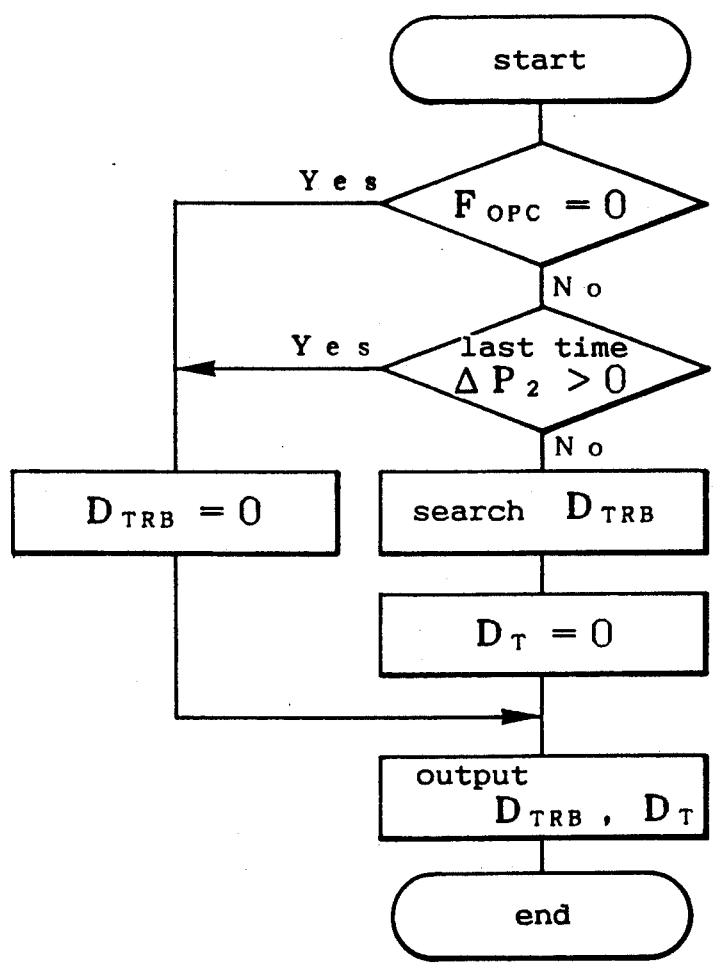

ENGINE CONTROL DEVICE

This application is a continuation of application Ser. No. 07/457,233 filed on Dec. 26, 1989, now abandoned.

TECHNICAL FIELD

The present invention relates to an engine control system for an engine equipped with a variable valve actuating mechanism, such as a variable valve timing system, and a variable capacity supercharger, such as a turbocharger having moveable vanes to vary the cross sectional area of the exhaust gas passage leading to a turbine wheel, and in particular to such an engine control system which permits the advantages of both a variable valve actuating mechanism and a variable capacity supercharger to be fully utilized by harmonious combination of the two variable elements.

BACKGROUND OF THE INVENTION

A valve operation switching unit for improving a volume efficiency of the combustion chambers over a wide operation range by changing at least either the angular interval of opening the intake valves and/or exhaust valves for each cylinder or the lift of the valves is proposed for instance in Japanese patent laid open publication No. 63-16111.

A variable capacity supercharger offering an optimum supercharge pressure over a wide operating range with a high responsiveness by varying the A/R ratio of an exhaust passage leading to a turbine wheel by means of a flap or a plurality of vanes is proposed in Japanese patent laid open publication No. 62-282128.

According to such a variable capacity supercharger, since a supercharge pressure which is suitable for each operating condition can be arbitrarily and accurately obtained, an even further improvement can be achieved particularly by combining a valve operating condition switching unit and a variable capacity supercharger.

In low speed range it is possible to increase the speed of intake flow directed to the combustion chambers by reducing the angular interval of opening the valves and/or the valve lift, but this tends to limit the intake flow rate as the rotational speed of the engine increases. Conversely, by increasing the angular interval of opening the valves and/or the valve lift in high speed range, the volume efficiency of the engine intake improves as the rotational speed of the engine increases. Therefore, if a variable capacity supercharger used in conjunction with a valve operating condition switching unit is controlled in the same way as if it were used for an engine without any such valve operating condition switching unit, it would not be possible to obtain an optimum performance of the engine in all of its operating range.

In particular, since the change in the movement of the valves during each cycle of engine operation will affect conditions of the intake passages (such as the resonance frequency of the intake passage, the volume efficiency of engine intake, etc.), it is advantageous to adapt the mode of controlling the supercharger to such changes. For instance, in an engine using a valve timing adjusting system which switches over valve timing in step-wise fashion according to the change in the rotational speed of the engine, as the rotational speed of the engine is increased, the torque output reaches a peak value and then gradually diminishes before the valve timing is switched over to from a low speed mode to a high speed mode. This decline in the torque output between the point of the torque peak and the point of valve timing switch over may be felt by the operator as a torque dip, and it is desired to remove such a torque dip.

As an additional consideration, such a complex control action should not involve any undue delay as such a delay will seriously impair the commercial value of the vehicle on which the engine is mounted. However, a high responsiveness of an engine must be accompanied by a sufficient control stability.

Further, in view of the complexity of the overall control system, it is desired to have a fail safe feature to be incorporated into the system.

BRIEF SUMMARY OF THE INVENTION

Based upon such and other recognitions, a primary object of the present invention is to provide an engine control system which can achieve a maximum improvement in the performance of an engine which incorporates both a variable capacity supercharger and a variable valve actuating unit.

A second object of the present invention is to provide such an engine control system which combines a fast response and a stable control action.

A third object of the present invention is to provide such an engine control system which can eliminate the occurrence of a torque dip which may occur if the valve actuating mechanism is varied in step-wise fashion and the rotational speed is increased close to a point of a step-wise varying action.

A fourth object of the present invention is to provide such an engine control system which is protected from operating in any undesirable fashion even in case of a system failure.

These and other objects of the present invention can be accomplished by providing an engine control system, comprising: valve actuating condition varying means for varying a state of a valve actuating mechanism of an engine; capacity varying means for varying a supercharge capacity of a variable capacity supercharger; and control means for controlling a valve actuating condition varying operation of the valve actuating condition varying means and a capacity varying operation of the capacity varying means according to an operating condition including at least a rotational speed of the engine; the control means carrying out the capacity varying operation in dependence upon an operating condition of the valve actuating mechanism.

Thus, an optimum control of supercharge pressure can be accomplished in response to an operating condition of valves. In particular, if the control means increases the supercharge pressure in case of high speed operation of the engine, the high speed performance of the engine can be improved. Conversely, if supercharge pressure is decreased according to the increase in the torque output of the engine owing to the switching of the valve operating condition, burden on the engine can be reduced in its high speed operating condition.

According to a preferred embodiment of the present invention, the control means carries out the capacity varying operation of the supercharger by an open loop control process at least when the valve actuating means is adapted for a low speed operating condition of the engine, and by a closed loop control process at least when the valve actuating means is adapted for a high speed operating condition of the engine. Typically, the open loop control process consists of a map control which determines the supercharge capacity according to a rotational speed of the engine and an opening angle of a throttle valve or an intake negative pressure.

According to the preferred embodiment of the present invention, in order that an undesirable dip in the output property of the engine due to the changes in the intake conditions of the engine due to the activation of the valve actuating condition varying means may be avoided, the control means may change the supercharge pressure of the supercharger at least in a low speed range from a normally controlled level to a boosted level according to a change rate of a level of supercharge pressure, and/or a change rate of a rotational speed of the engine. Normally, the supercharge pressure output of the supercharger should be increased when a decline in the supercharge pressure is detected as the rotational speed of the engine is increased because such decline in the supercharge pressure means a decline in the volume efficiency of the engine intake, and, in order to remove a torque dip resulting therefrom, the supercharge pressure output of the supercharger should be increased to compensate for the reduction in the volume efficiency.

BRIEF DESCRIPTION OF THE DRAWINGS

Now the present invention is described in the following in terms of a specific embodiment with reference to the appended drawings, in which:

FIGS. 6 through 11 are flow charts of the subroutines which are related to the above mentioned programs.

DETAILED DESCRIPTION OF THE PREFERRED EMBODIMENT

Figure 1:
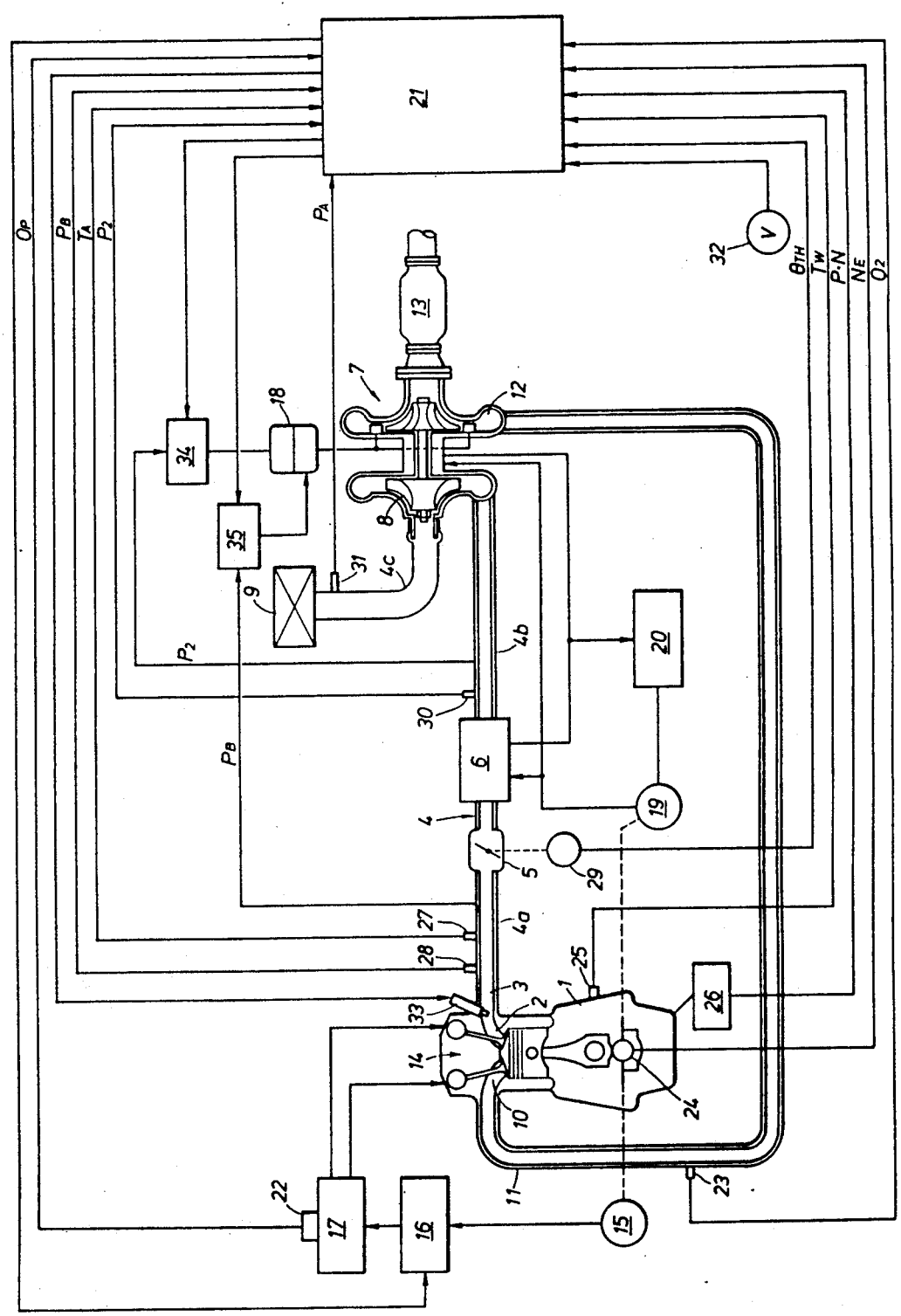
FIG. 1 is an overall structural diagram of the control system for an engine according to the present invention.

FIG. 1 shows an overall structure of the intake and exhaust system of an engine to which the present invention is applied. In this engine main body 1, for instance consisting of an in-line four-cylinder engine, an intake manifold 3 leading to the intake port 2 of each cylinder is connected to an intake tube 4, a throttle body 5, an intercooler 6, a compressor unit 8 of a variable capacity supercharger 7, and an air cleaner 9, in that order. An exhaust manifold 11 leading to the exhaust port 10 of each cylinder is connected to a turbine unit 12 of the variable capacity supercharger 7, and a catalytic converter 13.

A valve mechanism 14 provided for controlling the intake of mixture and the exhaust of combustion gas into and out of the combustion chamber of each cylinder can change valve timing in a stepwise fashion by controlling hydraulic pressure produced from an oil pump 15 actuated by the engine main body 1, by way of a solenoid valve 16 and a switching control valve 17.

The variable capacity supercharger 7 can continually vary a cross sectional area of a passage for exhaust gas leading to its turbine unit 12 by way of an actuator 18 which is actuated by supercharge pressure $P_2$ immediately downstream of the compressor unit 8 or intake negative pressure immediately downstream of the throttle valve 5 to vary the supercharging capacity of its compressor unit 8. This turbocharger 7, along with the intercooler 6, is cooled by cooling water which is circulated by a water pump 19 actuated by the engine main body 1 through a cooling water system including a radiator 20, which is separate from the cooling water system for the engine main body 1.

The engine 1 is equipped with an electronic control circuit 21 for controlling the amount of fuel injection, valve timing and supercharge pressure for the engine 1.

The electronic control circuit 21 receives an oil pressure signal $O_P$ from an oil pressure switch 22 of a normally closed type provided in the switching control valve 17, an $O_2$ signal from an oxygen concentration sensor 23 provided in the exhaust manifold 11, a rotational speed signal $N_E$ from an engine rotational speed sensor 24, a water temperature signal $T_W$ from a cooling water temperature sensor 25 provided in the water jacket of the engine main body 1, a parking/neutral signal PN indicating the shift position of the automatic transmission system 26 to be either in a parking or neutral range, an intake temperature signal $T_A$ and an intake pressure signal $P_B$ from an intake temperature sensor 27 and an intake pressure sensor 28, respectively, provided in a part of the intake passage 4a downstream of the throttle body 5, a throttle valve opening angle signal $\theta_{TH}$ from a throttle opening angle sensor 29, a supercharge pressure signal $P_2$ from a supercharge pressure sensor 30 provided in a part of the intake passage 4b downstream of the compressor unit 8, an atmospheric pressure signal $P_A$ from an atmospheric pressure sensor 31 provided in a part of the intake passage 4c extending between the air cleaner 9 and the compressor unit 8 of the turbocharger 7, and a vehicle speed signal V from a vehicle speed sensor 32. Output signals from this electronic control circuit 21 control the operations of solenoid valves for switching over valve timing, fuel injection valves 33 for injecting fuel into the intake ports 2, and solenoid valves 34 and 35 for controlling the supercharge pressure $P_2$ and the intake negative pressure $P_B$ for actuating the actuator 18 for varying the supercharger capacity.

The valve actuating mechanism 14 is now described in the following with reference to FIG. 2.

The engine to which the present invention is applied consists of a so-called DOHC engine in which intake valves and exhaust valves are actuated by separate camshafts, and each cylinder is equipped with two intake valves and two exhaust valves. Since the intake valves and the exhaust valves have a substantially same structure, only the part of the valve actutating mechanism 14 related to the intake valve mechanism is described in the following.

For each cylinder, three rocker arms 41, 42 and 43 are pivotally supported on a rocker arm shaft 40, which is secured to a cylinder head, adjacent to each other and so as to be rotatable in mutually independent manner. A camshaft 45 is rotatably supported by cam journals 44 formed in the cylinder head above the rocker arms 41, 42 and 43.

The camshaft 45 is provided, for each cylinder, a pair of low speed cams 46a and 46b having a relatively small angular interval of opening the valves and a relatively small valve lift, and a single high speed cam 47 having a relatively large open valve angular interval and a relatively large valve lift. A pair of oil supply tubes 48 and 49 are disposed above the camshaft 45 to lubricate the camshaft 45 and the sliding surfaces between the cams and the rocker arms. The free ends of the first and second rocker arms 41 and 42 which engage with the low speed cams 46a and 46b abut the upper ends of the valve stems of a pair of intake valves 50a and 50b which are elastically urged towards their closed positions. The third rocker arm 43 disposed between the first and second rocker arms 41 and 42 and engaged with the high speed cam 47 is engaged, at its lower end, with a lost motion spring not shown in the drawing so as to be normally urged upwards.

The first through third rocker arms 41 through 43 which are disposed one next to the other are internally provided with a coupling switch over unit 51 which consists of a guide bore passed through the rocker arms and switching pins slidably received therein.

The first rocker arm 41 is provided with a first guide bore 52 having an open end facing the third rocker arm 43 and a closed bottom end and extending in parallel with the rocker arm shaft 40. The first guide bore 52 slidably receives a first switching pin 53 therein. The bottom end of the first guide bore 52 defines an oil pressure chamber 54 which is communicated with an oil supply passage 57 defined in the hollow rocker arm shaft 40 via an oil passage 55 defined in the first rocker arm 41 and an oil supply opening 56 opening on an outer periphery of the rocker arm shaft 40.

The third rocker arm 43 is provided with a second guide bore 58 which extends in parallel with the rocker arm shaft 40 and aligns with the first guide bore 52 in a conformal and coaxial manner at its rest position in which its cam slipper engages with a base circle of the high speed cam 47, and a second switching pin 59 is received therein with its one end abutting the first switching pin 53.

The second rocker arm 42 is likewise provided with a third guide bore 60 having a closed bottom end, and receives a stopper pin 61 therein with its one end abutting the other end of the second switching pin 59.

The stopper pin 61 has a stem portion 63 which is received in a guide sleeve 62 fitted into the bottom end of the third guide bore 60, and is normally elastically urged towards the third rocker arm 43 by a return spring 64.

Figure 2:
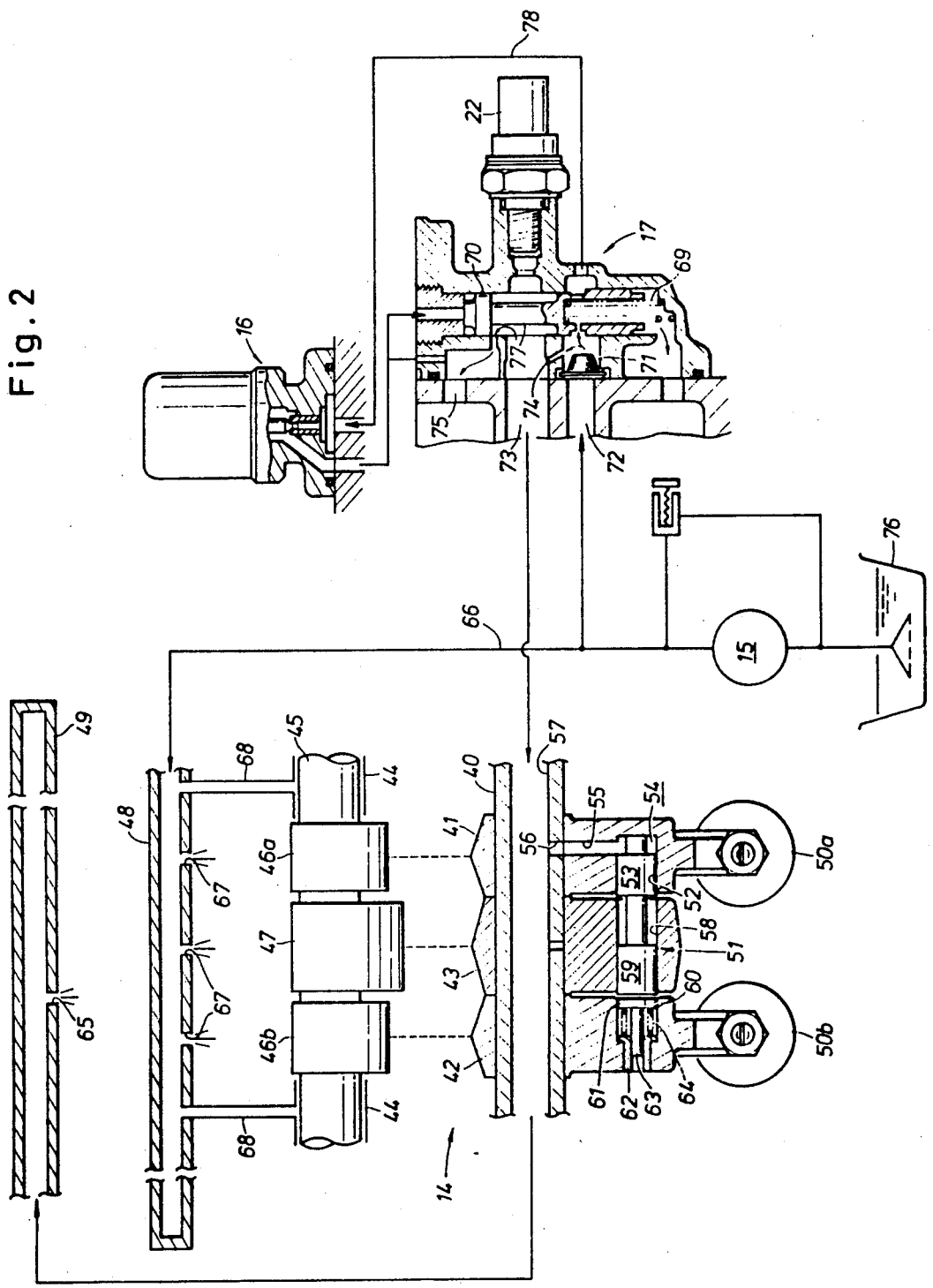
FIG. 2 is a structural view of a part surrounding a valve actuating mechanism.

By displacing the first and second switching pins 53 and 59 in lateral direction as seen in FIG. 2 by means of the oil pressure applied to the oil pressure chamber 54 and the biasing force of the return spring 64, one can selectively obtain either a state in which the rocker arms 41 through 43 can move independently as shown in FIG. 2 and another state in which the rocker arms 41 through 43 are integrally coupled with one another by the switching pins 53 and 59 straddling between the adjacent rocker arms so as to simultaneously and jointly actuate the two intake valves 50a and 50b.

The downstream end of the oil supply passage 57 internally provided in the rocker shaft 40 is connected to one of the aforementioned oil passages or, more specifically, the high speed oil supply tube 49. This high speed oil supply tube 49 is provided with a nozzle 65 for spraying lubricating oil onto a position corresponding to the high speed cam 47.

The other oil supply tube or the low speed oil supply tube 48 is connected to a lubrication oil passage 66 branched off from an oil gallery. This low speed oil supply tube 48 is provided with nozzles 67 for spraying lubricating oil onto positions corresponding to the cams 46a, 46b and 47, and, additionally, supplies lubricating oil to the cam journals 44 via oil passages 68.

The switching control valve 17, mounted on the cylinder head, is actuated by oil pressure which is supplied from the solenoid valve 16 controlled by the aforementioned control signal and is internally provided with a spool valve 70 which is normally urged towards its closed position by a return spring 69.

When this spool valve 70 is at its upper closed position (as shown in FIG. 2), an inflow port 72 leading to the lubrication oil passage 66 is communicated, via an oil filter 71, with an outflow port 73 leading to the oil passage 57 in the rocker arm shaft 40 solely through an orifice 74. At the same time, the outflow port 73 is communicated with a drain port 75 opening into an upper space of the cylinder head, and the oil pressure in the oil supply passage 57 thereby drops. Therefore, no oil pressure is supplied to the oil supply passage 57, and the pins 53 and 59 are urged all the way towards the oil pressure chamber 54 under the spring force of the return spring 64 so that the rocker arms are independently actuated by the associated cams and undergo independent angular displacements. In this case, the oil supplied by the oil pump 15 from an oil pan 76 to the oil gallery is supplied to the low speed lubricating oil supply tube 48 via the lubricating oil passage 66, and lubricates the sliding surfaces between the cams and the rocker arm as well as the cam journals 44.

When the spool valve 70 is switched over to its lower open position, the inflow port 72 communicates with the outflow port 73 via an annular groove 77 of the spool valve 70 and the outflow port 73 is disconnected from the drain port 75 so that oil under pressure is supplied from the lubrication oil passage 66 to the oil supply passage 57. As pressurized oil is thereby supplied to the oil pressure chamber 54 of the first rocker arm 41, the first and second switching pins 53 and 59 are forced into the second guide bore 58 and the third guide bore 60, respectively, against the biasing force of the return spring 64, and the rocker arms 41 through 43 are integrally coupled with one another. The pressurized oil which is supplied to the oil supply passage 57 to actuate the coupling switch over unit 51 is then supplied to the high speed lubrication oil supply tube 49 via the downstream end of the oil supply passage 57 to lubricate the sliding surface between the high speed cam 47 and the third rocker arm 43.

The spool valve 70 is switched over to its open position, against the biasing force of the return spring 69, by a pilot pressure which is applied to the upper end of the spool valve 70 from a pilot oil passage 78 branched off from the inflow port 72. The normally closed solenoid valve 16 is interposed in this pilot oil passage 78 and the solenoid of this solenoid valve 16 is controlled by an output signal from the electronic control circuit 21 in such a manner that the spool valve 70 is brought to its open position by opening of the solenoid valve 16 to thereby achieve a high speed valve timing and the spool valve 70 is brought to its closed position by closing of the solenoid valve 16 to thereby achieve a low speed valve timing.

The switching action of the spool valve 70 is monitored by the oil pressure switch 22 provided in the housing of the switching control valve 17 to be turned on and off depending on the detection of a low pressure and a high pressure, respectively, in the oil pressure of the outflow port 73.

The variable capacity turbocharger 7 is now described in the following with reference to FIG. 3. As this turbocharger 7 is conventional as far as its compressor unit 8 is concerned, only its turbine unit 12 is described in the following.

A turbine casing 80 of the turbocharger 7 is provided with a scroll passage 81 whose cross sectional area gradually diminishes towards its downstream end, and an exhaust outlet 82 opens out from this scroll passage 81 along its tangential direction. In a central part of the scroll passage 81 is located a turbine wheel 83 which is integrally attached to an end of a turbine shaft coaxial to the compressor shaft.

Inside the scroll passage 81 are provided four arcuate fixed vanes 84 which are integral with the turbine casing 80 and arranged on a common circle at an equal interval and an equal width. Thus, the scroll passage 81 is separated into an outer passage 85 and an inner passage 86 by these fixed vanes 84.

Four moveable vanes 87, each having a substantially same curvature as the fixed vanes 84, are disposed between the fixed vanes 84 on the same common circle as the fixed vanes 84. Each of the moveable vanes 87 is pivotally supported at one of its circumferential ends so as to be pivotable only into the interior of the aforementioned common circle and define a continual aerofoil in cooperation with the adjacent fixed vane 84. The inclination angle of each of the moveable vanes 87 is continually controlled by a moveable vane actuation control unit which will be described hereinafter.

The moveable vane actuation control unit comprises lever members 89 each projecting integrally from a pivot shaft 88 of each of the moveable vanes 87, a pair of see-saw members 91 each pivotally supported and provided with slots 90 on either end thereof for engagement with two of the lever members 89, a pair of link arms 94 each of which is coupled with the pivot shaft 92 of one of the see-saw members 91 at its one end and to a link rod 93 at its other end, and the actuator 18 serving as a drive source for the moveable vanes 87. This actuator 18 is provided with a drive shaft 95 which is adapted to move axially back and forth by fluid pressure and coupled with the link rod 93 via a coupling rod 96.

In the above described link mechanism, the drive shaft 95 and the coupling rod 96 are coupled with each other by a ball joint 97, and the coupling rod 96 and the link rod 93 are coupled with each other by a crevice joint 98 in such a manner that the actuating force from the actuator 18 may be smoothly transmitted to the link arm 94. Also, in order to define fully open positions of the moveable vanes 87 by restricting the stroke of the drive shaft 95, the coupling rod 96 is integrally provided with a stopper 101 which abuts an adjusting bolt 100 threaded with a bracket 99 integrally mounted on the turbine casing 80.

The actuator 18 comprises a cup-shaped casing 102, and a diaphragm 103 secured to the open end of the casing 102 by crimping a cover 103 thereon, and this diaphragm 103 defines a negative pressure chamber 105 and a positive pressure chamber 106 in the actuator 18.

A base end of the drive shaft 95 is attached to a central part of the diaphragm 104 via retainers 107 and 108. A compression coil spring 109 is interposed between the retainer 107 facing the negative pressure chamber 105 and the bottom wall of the casing 102 to normally urge the diaphragm 104 along with the drive shaft 95 towards the cover 103 or rightward as seen in FIG. 3.

The drive shaft 95 is slidably supported by a central part of the bottom wall of the casing 102. The part of the drive shaft 95 projecting out of the bottom wall of the casing 102 is enclosed, in an air-tight fashion, by a soft and frictionless bellows 110 which is made by cutting a cylindrical fluoride resin member in an annular fashion from both inside and outside in an alternating fashion at small interval. The interiors of the negative pressure chamber 105 and the bellows 101 are communicated with each other by a through hole 111.

The casing 102 is provided with a negative pressure introduction inlet 112 for communicating the negative pressure chamber 105 with the outside and the cover 103 is provided with a positive pressure introduction inlet 113 for communicating the positive pressure chamber 106 with the outside.

Figure 3:
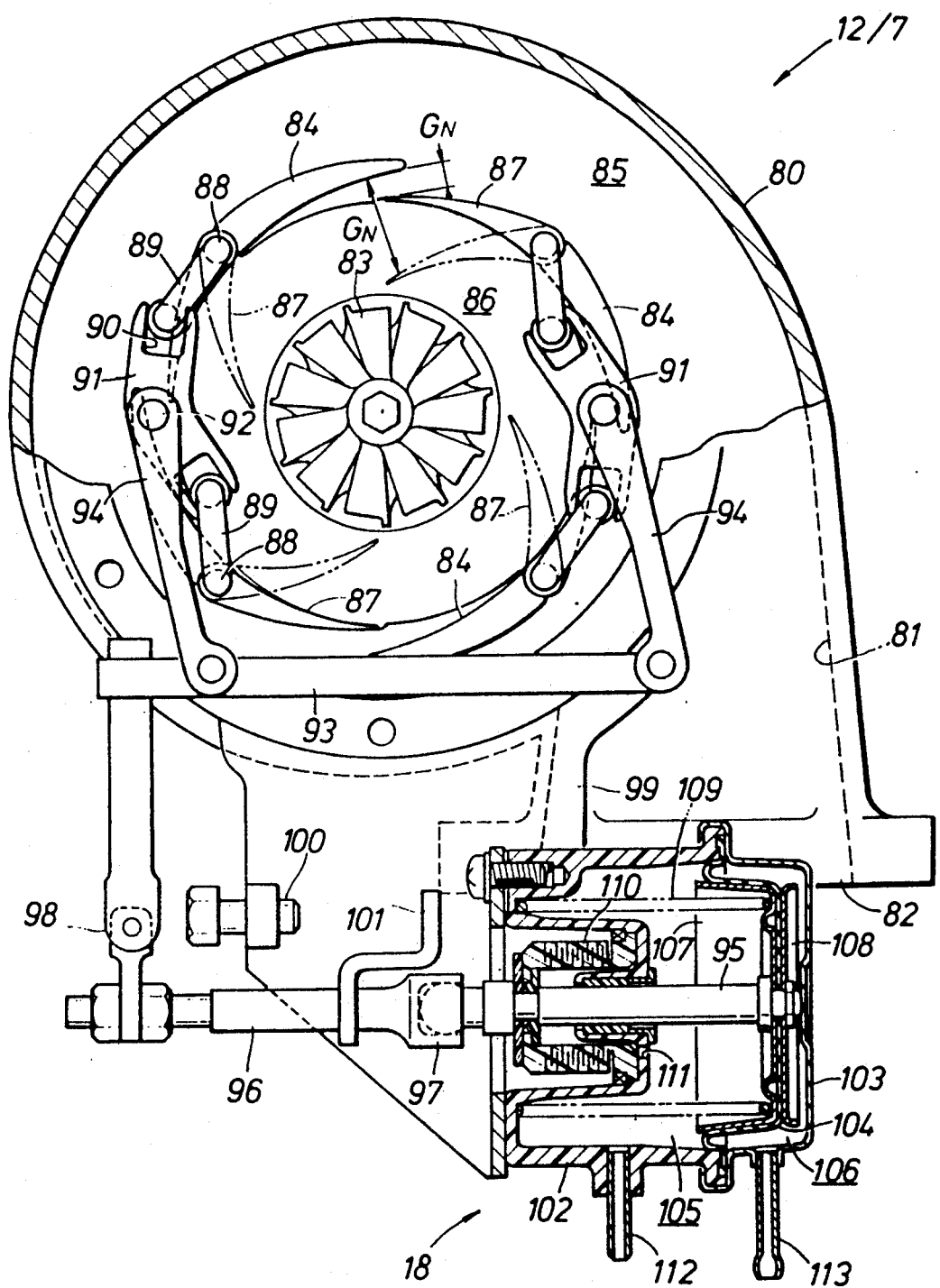
FIG. 3 is a view illustrating the mechanism of the variable capacity turbocharger.

In this actuator 18, when a positive pressure is introduced into the positive pressure chamber 106 from the positive pressure introduction inlet 113, the diaphragm 104 is pushed leftward as seen in FIG. 3 against the biasing force of the compression coil spring 109, and the drive shaft 95 is driven leftward. When a negative pressure is introduced into the negative pressure chamber 105 from the negative pressure introduction inlet 112, the drive shaft 95 is likewise driven leftward by the diaphragm 104. In other words, in a low opening angle range of the throttle valve where the intake negative pressure $P_B$ is high, the actuator 18 is actuated so as to push out the drive shaft 95. The link rod 93 is thereby moved leftward as seen in FIG. 3, and this in turn causes the link arms 94 to turn in clockwise direction around the pivot shaft 92 with the result that the moveable vanes 87 are turned inwards around the pivot shafts 88 by being actuated by the lever members 89 which are each engaged with the slots 90 on either end of each of the see-saw members 91. By thus opening the moveable vanes 87, one can obtain a maximum capacity condition in which the nozzle gaps $G_N$ defined between the leading edges of the fixed vanes 84 and the trailing edges of the moveable vanes 87 are maximized (as shown by the imaginary lines in FIG. 3).

When the supply of a negative pressure $P_B$ to the negative pressure chamber 105 is discontinued by controlling the aforementioned solenoid 35 for controlling negative pressure, the negative pressure in the negative pressure chamber 105 is reduced and the drive shaft 95 is pulled in by the spring force of the coil spring 109. As a result, the link rod 93 is moved rightward as seen in FIG. 3, and the see-saw members 91 are turned by the link arms 94 in counter-clockwise direction so that the moveable vanes 87 are moved outward around the pivot shafts 88 by way of the lever members 89 each engaged with the slots 90 on either end of each of the see-saw member 91 (as shown by the dotted lines in FIG. 3). By thus closing the moveable vanes 87, one can obtained a minimum capacity condition in which the nozzle gaps $G_N$ defined between the leading edges of the fixed vanes 84 and the trailing edges of the moveable vanes 87 are minimized. Therefore, the exhaust gas flow is narrowed and accelerated to the maximum extent and drives the turbine wheel 83 as a circular flow flowing through the inner circumferential passage 86 so as to maximize the effect of supercharging in low speed range of the engine.

As the rotational speed of the engine is increased and a sufficient supercharge effect is obtained, the solenoid valve 34 for positive pressure control is controlled and a supercharge pressure $P_2$ is introduced into the positive pressure chamber 106. The actuator 18 is thereby actuated in the direction to push out the drive shaft 95, and the see-saw members 91 are turned in clockwise direction by turning the link arms 94 in opposite direction so that the moveable vanes 81 may be turned inward by way of the lever members 89. By thus expanding the nozzle gaps $G_N$, no acceleration is effected on exhaust gas and the exhaust gas encounters little flow resistance whereby the engine is subjected to less back pressure.

The opening amount of the moveable vanes 87 was controlled primarily by the solenoid valve 34 for positive pressure control in the present embodiment, but it is also possible to use the solenoid valve 35 for negative pressure control in combination.

Figure 4A:
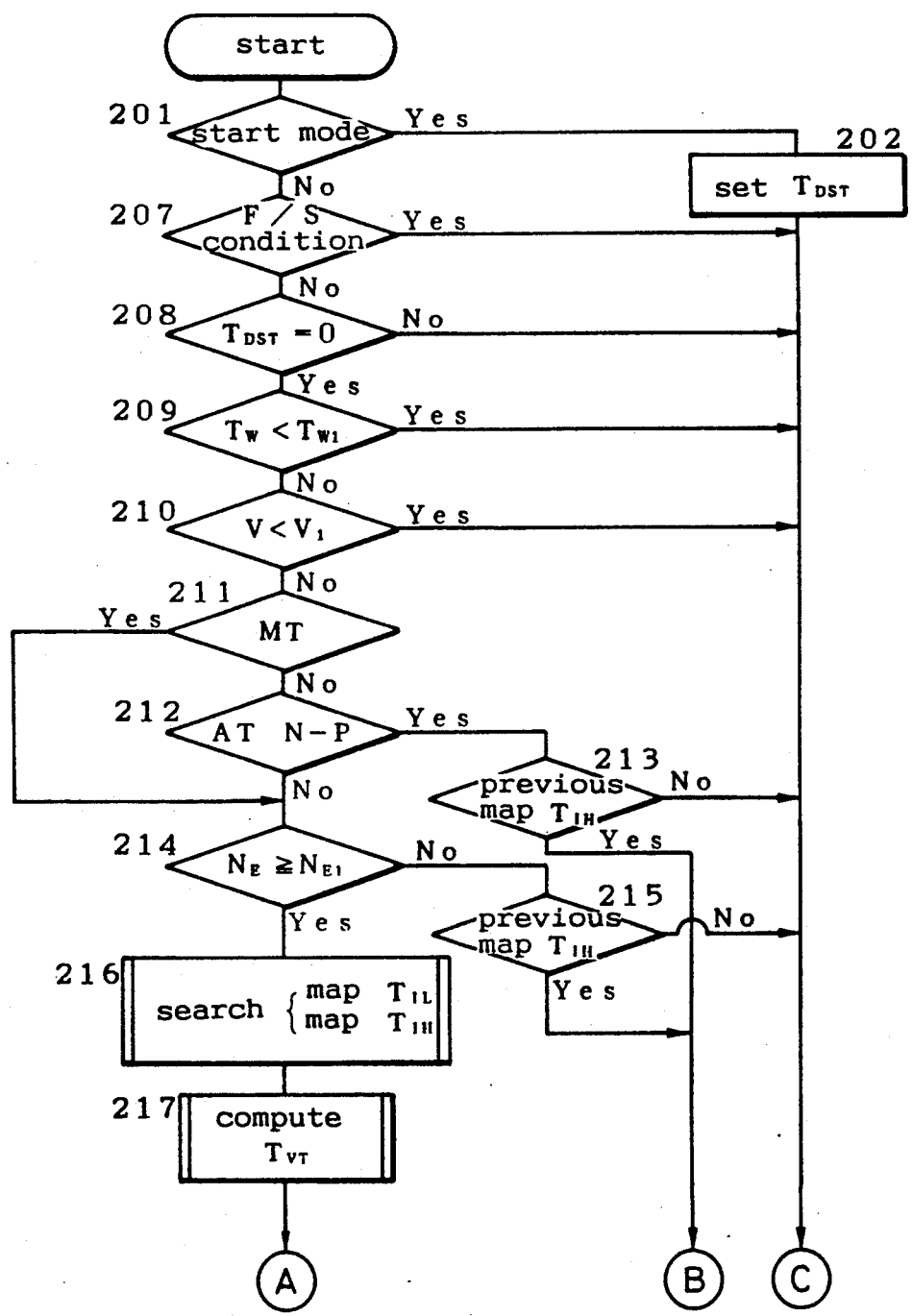
FIGS. 4a through 4d are flow charts of the control program which is related to the switch over of valve timing.
Figure 4B:
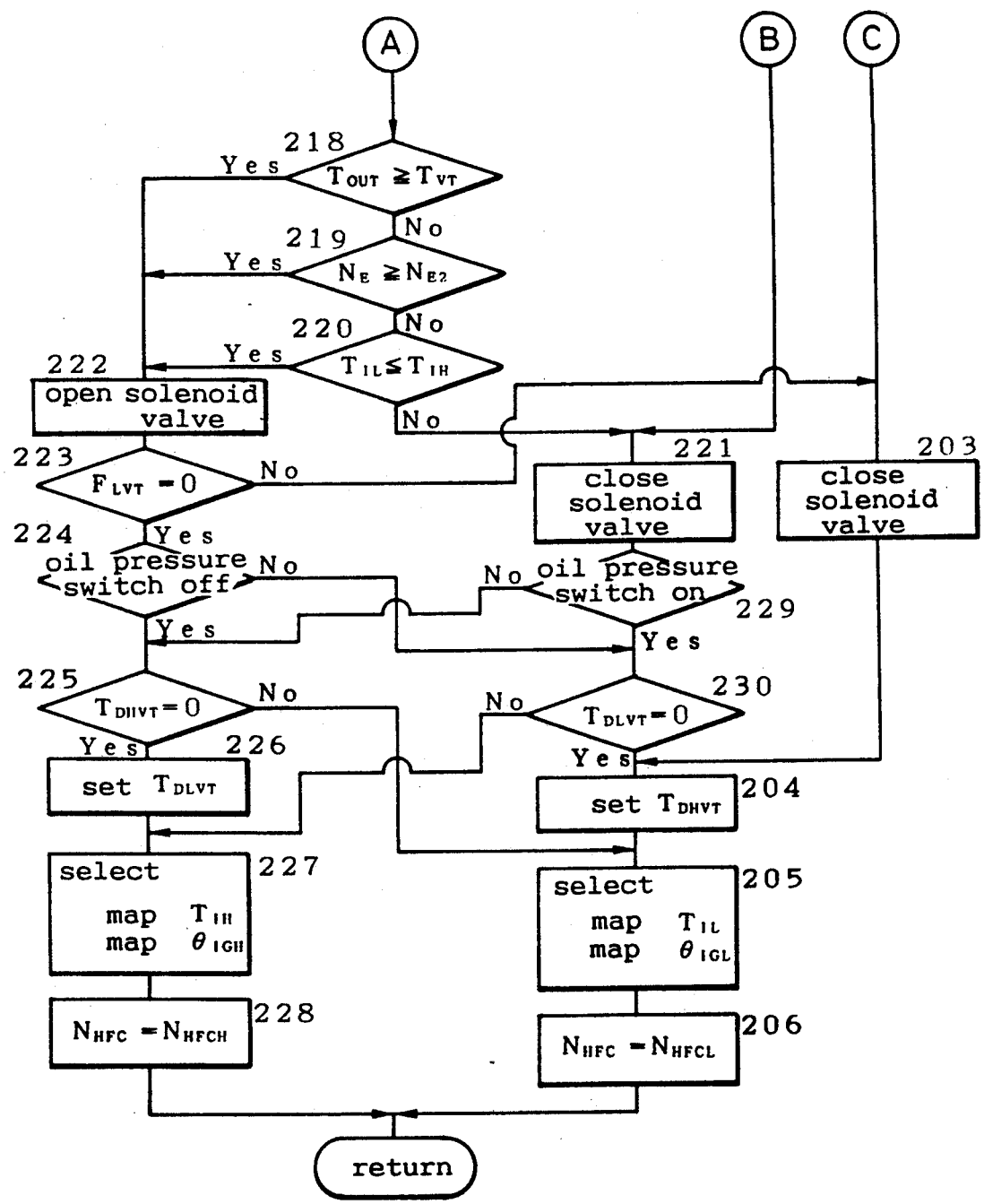

A control program incorporated in the electronic circuit 21 to control the solenoid valve 16 for valve timing switch-over is now described in the following with reference to FIGS. 4a and 4b.

In the first step 201 it is determined whether an initial mode has been started or, in other words, the engine is being cranked or not. If the engine is being cranked, an elapsed time $T_{DST}$ (for instance 5 seconds) after starting of the engine is set up and the measurement of time after starting of the engine is set ready in the second step 202. Then in the third step 203, a valve close command is issued to the solenoid valve 16, and the engine is operated at low speed valve timing. In the fourth step 204, an elapsed time $T_{DHVT}$ (for instance 0.1 second) after switching over to a high speed valve timing is set and the measurement of delay time after a switch-over to a high speed valve timing is set ready. In the fifth step 205, maps $T_{IL}$ and $\theta IGL$ corresponding to a low speed valve timing operation is selected as a basic fuel injection amount determining map and ignition timing map which are to be used in a fuel injection control routine, and in the sixth step 206 a revolution limit value $N_{HFC}$ for cutting off fuel supply is set to a value $N_{HFCL}$ which corresponds to low speed valve timing operation.

Now, the amount of fuel injection $T_{OUT}$ is given by the following formula:
$$T_{OUT} = K1 T_1 + K2$$
where $T_1$ is a basic amount of fuel injection, K1 is a correction factor, and K2 is a constant term.

K1 accounts for an intake temperature correction factor $K_{TA}$ for increasing fuel supply when the intake temperature $T_A$ is low, a cooling water temperature correction factor $K_{TW}$ for increasing fuel supply when the cooling water temperature $T_W$ is low, a high load fuel boosting factor $K_{WOT}$ which increases fuel supply in a high speed range determined by the engine rotational sped $N_E$, the intake negative pressure $P_B$ and the throttle opening angle $\theta_{TH}$, and a feedback correction factor for correcting the deviation of the air/fuel ratio from a theoretical ratio in an $O_2$ feedback region of a relatively low speed range (for instance 4,000 rpm), while K2 accounts for an acceleration fuel boosting factor which increases fuel supply during acceleration of the engine.

The basic amount of fuel injection $T_I$ is experimentally determined so that intake mixture achieves a target air/fuel ratio which is close to an ideal air/fuel ratio according to the amount of air introduced into the cylinder in each particular operating condition of the engine as determined by the rotational speed of the engine $N_E$ and the intake negative pressure $P_B$, and the electronic control circuit 21 stores a $T_{IL}$ map for low speed valve timing operation and a $T_{IH}$ map for high speed valve timing operation, as a $T_I$ map.

The shorter the angular interval of opening the valves, the greater the valve acceleration becomes during the opening phase of the valves. At the same time, as the valve acceleration increases, the rotational speed $N_E$ of the engine at which the valves start jumping becomes lower. Therefore, the permissible maximum rotational speed of the engine differs depending on whether a high speed valve timing condition or a low speed valve timing condition is being selected as they have different intervals of opening the valves. According to the present embodiment, the revolution limiter value $N_{HFCL}$ is set to a relatively low value (for instance 7,500 rpm) during low speed valve timing operation and to a relatively high value (for instance 8,100 rpm) during high speed valve timing operation.

If it is determined in the first step 201 that the engine is not being cranked or, in other words, the engine is already running, it is then determined in the seventh step 207 whether signals from various sensors are being normally supplied to the electronic control circuit 21 or not, or, in other words, a determination is made whether a fail-safe condition exists or not.

If it is judged that no fail-safe situation exists or, in other words, a normal condition exists, the time remaining from the time interval $T_{DST}$ after starting the engine, which was set up in the second step 202, is evaluated in the eighth step 208. If the remaining time is not zero, the system flow advances to the third step 203. If there is no remaining time, the system flow advances to the ninth step 209 where it is determined whether the cooling water temperature $T_W$ is less than a predetermined temperature $T_{W1}$ (for instance 60 degrees C.) or not, or, in other words, whether the engine has been warmed up or not. If the cooling water temperature $T_W$ is found to be less than the predetermined temperature $T_{W1}$, the system flow advances to the third step 203, and if the cooling water temperature $T_W$ is found to be equal to or higher than the predetermined temperature $T_{W1}$ it is determined in the tenth step 210 whether the vehicle speed V is lower than a certain extremely low speed level $V_1$ (which may contain hysteresis and range from 5 to 8 km/h) or not. If the vehicle speed V is lower than the extremely low speed level $V_1$ the system flow advances to the third step 203, and if the vehicle speed V is equal to or higher than the extremely low speed level $V_1$ it is determined if the vehicle is equipped with a manual transmission system MT or not in the eleventh step 211.

Thus, a low speed valve timing condition is produced and, at the same time, a corresponding mode of fuel injection control is selected before starting, during cranking, immediately after starting, before engine warm-up, while stopping or while running slowly. This measure is taken in order to prevent occurrence of faulty operation of the coupling switch-over unit 51 due to the viscosity of lubricating oil and occurrence of abnormal combustion.

If it is determined in the eleventh step 211 that the vehicle is not equipped with a manual transmission system MT or it is equipped with an automatic transmission AT, it is determined in the twelfth step 212 if parking range P or a neutral range N is selected for its shift position or not. If either P or N range is selected, it is determined in the thirteenth step 313 whether a $T_{TH}$ map for high speed valve timing was selected in the previous cycle or not. If not, the system flow returns to the third step 203. If the vehicle is equipped with a manual transmission system, a comparison is made, in the fourteenth step 214, between a rotational speed lower limit $N_{E1}$ (which may range between 4,800 and 4,600 rpm including hysteresis), below which the engine output in low speed valve timing condition is always higher that that in high speed valve timing condition, and the current rotational speed $N_E$ of the engine. If $N_E$ is less than $N_{E1}$, it is determined in the fifteenth step 215 if the $T_{TH}$ map for high speed valve timing was used in the previous cycle or not in the same way as in the thirteenth step 213. If not, the system flow advances to the third step 203.

It can be seen in the preceding steps that low speed valve timing is selected either when the vehicle may be stationary even though the rotational speed $N_E$ of the engine is high or when, even though the vehicle may be running, its speed is slow or the rotational speed of the engine is low, and a high speed running condition has not been experienced yet.

Figure 4C:
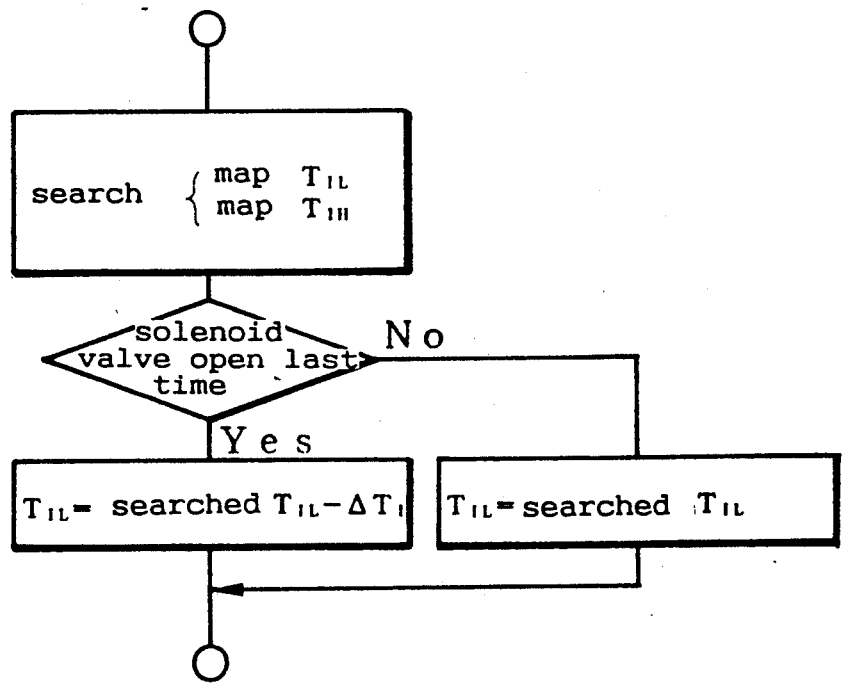
Figure 4D:
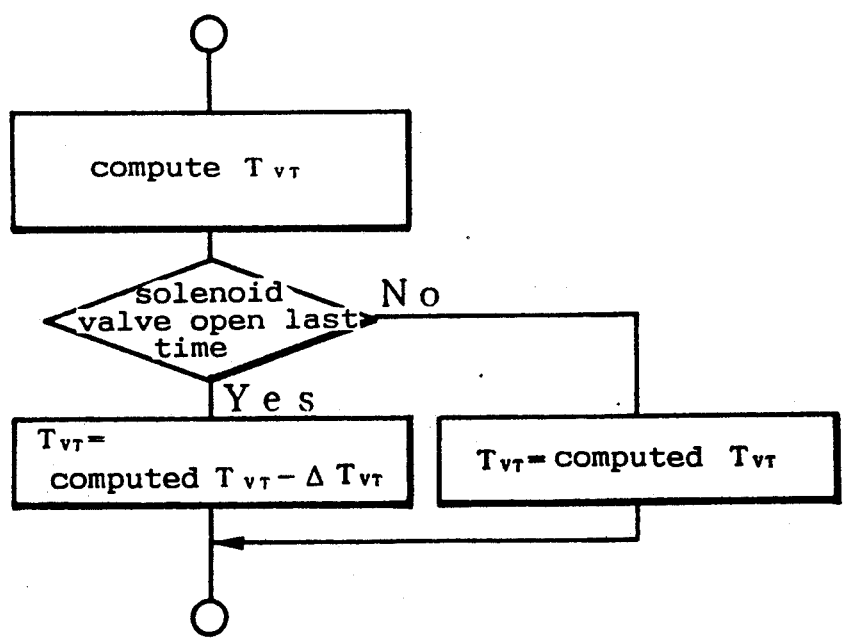

On the other hand, if it is found in the fourteenth step 214 that $N_E$ is equal to or higher than $N_{E1}$, a $T_{IL}$ map and the $T_{IH}$ map are searched in the sixteenth step 216 according to the subroutine shown in FIG. 4c to find the values of $T_{IL}$ and $T_{IH}$ which correspond to the rotational speed $N_E$ and the intake negative pressure $P_B$ of the engine at the current stage. Then, in the seventeenth step 217, a $T_{VT}$ value corresponding to the current value of $N_E$ is obtained, according to the subroutine given in FIG. 4d, from a high load determination value table $T_{VT}$ which is experimentally determined as such according to the amount of fuel injection.

As for values from the $T_{IL}$ and $T_{IH}$ maps, the $T_{IL}$ value which is to be used in the sixteenth step 216 consists of a value searched from the $T_{IL}$ map when a command to open the solenoid value 16 was not present in the previous cycle, and of a value obtained from the $T_{IL}$ map less a prescribed amount of hysteresis $\Delta T_I$ when a command to open the solenoid value 16 was present in the previous cycle. A similar process is executed in regards to the arithmetic process in the seventeenth step 217 for determining a $T_{VT}$ value. The $T_{VT}$ value which is to be used in. the seventeenth step 217 consists of a value searched from a $T_{VT}$ table when a command to open the solenoid value 16 was not present in the previous cycle, and of a value obtained from the $T_{VT}$ table less a prescribed amount of hysteresis $\Delta T_{VT}$ when a command to open the solenoid value 16 was present in the previous cycle, whereby a hysteresis is given to the switching property of the amount of fuel injection at the point of valve timing switch over.

In the subsequent eighteenth step 218, a comparison is made between this $T_{VT}$ value and the amount of fuel injection $T_{OUT}$ in the previous cycle. If the $T_{OUT}$ is found to be less than $T_{VT}$, a comparison is made in the nineteenth step 219 between a rotational speed upper limit $N_{E2}$ (which may range between 5,900 and 5,700 rpm including hysteresis) above which the engine output in high speed valve timing condition is always higher that that in low speed valve timing condition, and the current rotational speed $N_E$ of the engine. If $N_E$ is less than $N_{E2}$, a comparison is made in the twentieth step 220 between the $T_{IL}$ value and the $T_{TH}$ value obtained in the sixteenth step 216, and, if $T_{IL}$ is found to be larger than $T_{IH}$, a valve close command is supplied to the solenoid valve 16 in the twenty first step 221 or, in other words, low speed valve timing is selected.

If it was found in the thirteenth step 213 or in the fifteenth step 215 that the $T_{TH}$ map was selected in the previous cycle or a low load and low rotational speed condition is produced after experiencing a high speed running condition, the system flow advances to the twentyfirst step 221.

On the other hand, if its was found in the eighteenth step 218 that $T_{OUT}$ is equal to or larger than $T_{VT}$, if it was found in the nineteenth step 219 that $N_E$ is equal to or larger than $N_{E2}$, or if it was found in the twentieth step 220 that $T_{IL}$ is equal to or less than $T_{IH}$, a valve open command is issued to the solenoid valve 16 or, in other words, a high speed valve timing condition is selected. Thus, it can be seen that a point of switch over between high speed valve timing and low speed valve timing is determined from the rotational speed of the engine and the demanded amount of fuel injection.

An adjustment is made so as to have a relatively rich mixture in high load range, and a high speed valve timing operation is more desired for increasing the engine output in high load range. However, if the point of switching over valve timing is determined in a definite fashion, a hunting may occur in a boundary region and a shock may be produced due to an abrupt change in the torque output at the point of switch over. Therefore, according to the present embodiment, an optimum switch over control action is obtained by carrying out the composite steps of the eighteenth through twentieth steps 218 through 220.

Following selection of high speed valve timing operation, it it determined in the twenty third step if zero value is placed in a flag $F_{LVT}$ to indicate that low speed valve timing operation is not selected in the turbocharger control routine which will be described hereinafter. If it is determined that the turbocharger end presupposes low speed valve timing operation, the system flow advances to the third step 203. Otherwise, the system detects a signal from the oil pressure switch 22 in order to monitor the operating condition of the switch over control valve 17. If it is found that the oil pressure switch 22 is off or that oil pressure is acting upon the coupling switch over unit 51, the remaining time of the delay time $T_{DHVT}$ following the activation of the coupling switch over unit, which was previously set up in the fourth step 204, is determined in the twenty-fifth step 225. If $T_{DHVT}=0$, in the twenty-sixth step 226, a preparation for actuation of a delay timer is made following the setting up of a timer for the elapsed time $T_{DLVT}$ (for instance 0.2 seconds) following a switch over to low speed valve timing operation. Then, a fuel injection amount map $T_{IH}$ and an ignition timing $T_{IGH}$ corresponding to high speed valve timing operation are selected in the twenty-seventh step 227, and a revolution limiter value $N_{HFC}$ is changed to a value $N_{HFCH}$ for high speed valve timing in the twenty-eighth step 218.

Following the issuing of a valve close command to the solenoid valve 16 in the twenty-first step 221, presence of an oil pressure switch signal $O_P$ is detected in the twenty-ninth step 229. If the oil pressure switch 22 is turned on or no oil pressure is being applied to the coupling switch over unit 51, the time remaining from $T_{DLVT}$ which was set in the twenty-sixth step 226 is read out, and, if $T_{DLVT}=0$ the system flow returns to the fourth step 204.

If the oil pressure switch signal $O_P$ is not turned off in the twenty-fourth step 224 even though a switch over from low speed valve timing operation to a high speed valve timing operation is effected, the system flow advances to the thirtieth step 230 and the low speed valve timing operation is maintained until the oil pressure switch signal $O_P$ is turned off. Conversely, if the oil pressure switch signal $O_P$ is not turned on in the twenty-ninth step 229 even though a switch over from high speed valve timing operation to low speed valve timing operation is effected, the system flow advances to the twenty-fifth step 225 and the high speed valve timing operation is maintained until the oil pressure switch signal $O_P$ is turned off.

The time periods $T_{DHVT}$ and $T_{LHVT}$ which were set on the two delay timers in the fourth and the twenty-sixth steps 204 and 226, respectively, are determined according to the response time required from the time when the solenoid 16 is activated to move the spool valve 70 of the switch over control valve 17 until the time when the oil pressure of the supply oil passage 57 is changed and the switch over action of the switch over pins is completed for all the cylinders. Even when the beginning of a switch over action is detected from the oil pressure switch signal $O_P$, it is supposed that the change of valve timing for all the cylinders is not completed until $T_{DLVT}=0$ in case of a switch over from high speed to low speed or $T_{HLVT}=0$ in case of a switch over from low speed to high speed, and the engine is continued to be controlled according to the mode of fuel injection amount control preceding the command for a valve timing switch over is issued.

If the $T_{IH}$ map was not selected in the thirteenth step 213 or the fifteenth step 215 in the previous cycle or if the vehicle has just started moving or is accelerating, low speed valve timing operation is selected without determining the state of the oil pressure switch signal $O_P$. This measure is taken to prevent the problems which may arise if the signal is kept in its turned-off state due to a failure in the oil pressure switch 22. If the turbocharger end demanded low speed valve timing operation in the twenty-third step 223, fuel injection control is immediately switched over so as to adapt itself to low speed valve timing operation. This measure is taken to prevent the occurrence of abnormal combustion due to over-supercharging.

The control program for the solenoid 34 in varying the supercharge capacity of the turbocharger 7 or supercharge pressure is now described in the following with reference to FIGS. 5a through 5d. It should be noted that the solenoid 34 used in the present system for positive pressure control consists of a duty ratio controlled solenoid valve. This supercharge pressure control combines an open loop control which carries out supercharge pressure control according to a basic supercharge pressure control variable (which is referred to as basic duty $D_M$ hereinafter), and a feedback control which carries out supercharge pressure control by modifying the basic duty $D_M$ according to the deviation of the actual supercharge pressure from a predetermined target supercharge pressure.

It is determined in the first step 301 whether a start mode has been produce or not, or, in other words, whether the engine is being cranked or not. If a start mode has been detected, it is indicated by a flag $F_{LVT}=1$ that valve timing is going to be fixed to low speed valve timing in the second step 302. Then, after resetting a timer TDFB for delaying the onset of a feedback control in the third step 303, and the duty $D_{OUT}$ for the solenoid 34 is set to zero in the fourth step 304 before it is outputted in the fifth step 305. Here, it should be noted that the duty ratio of the solenoid of the solenoid valve 34 diminishes as the duty $D_{OUT}$ in the main routine becomes larger, and that $D_{OUT}=0$ means a 100% duty ratio condition in which the moveable vanes 87 are displaced to their most inward positions or in which the solenoid valve 34 is fully opened to maximize the cross sectional area of the air passages between the fixed vanes 84 and the moveable vanes 87. On the other hand, $D_{OUT}=100$ means a 0% duty ratio condition in which the moveable vanes 87 are displaced to their most outward positions or the cross sectional area of the air passages is minimized.

Figure 5A:
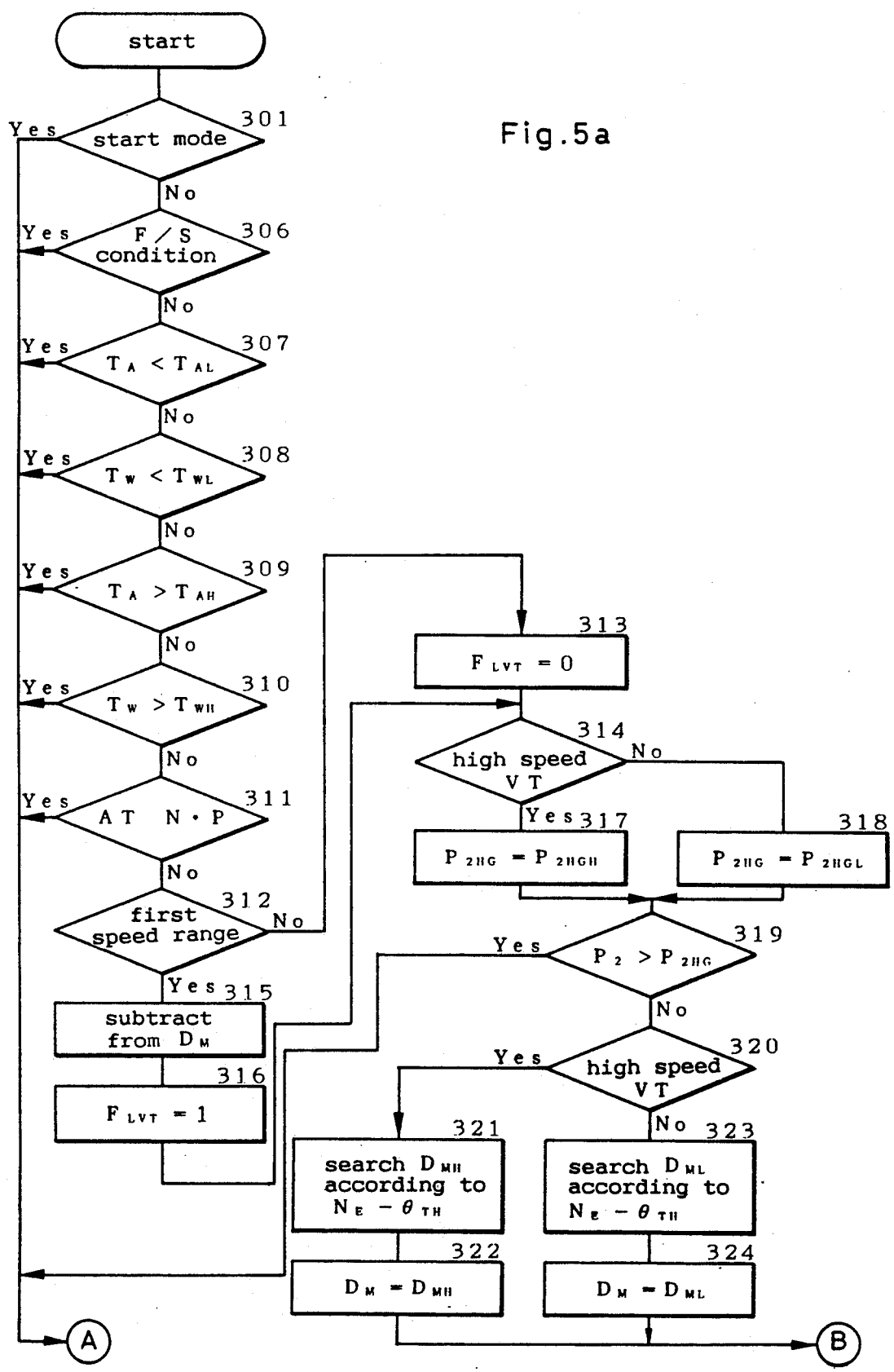
FIGS. 5a and 5d are flow charts of the control program which is related to the adjustment of supercharge pressure.
Figure 5B:
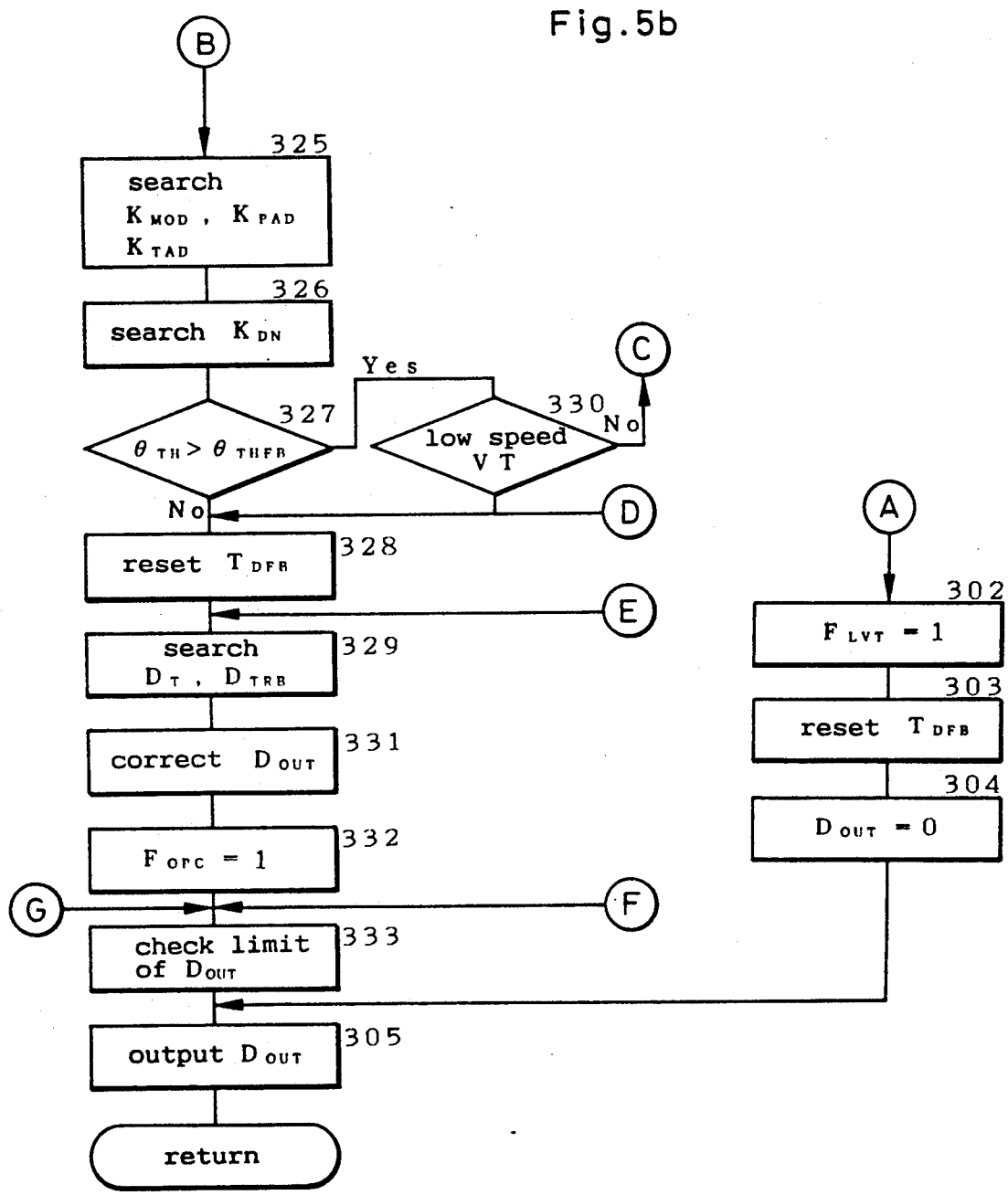
Figure 5C:
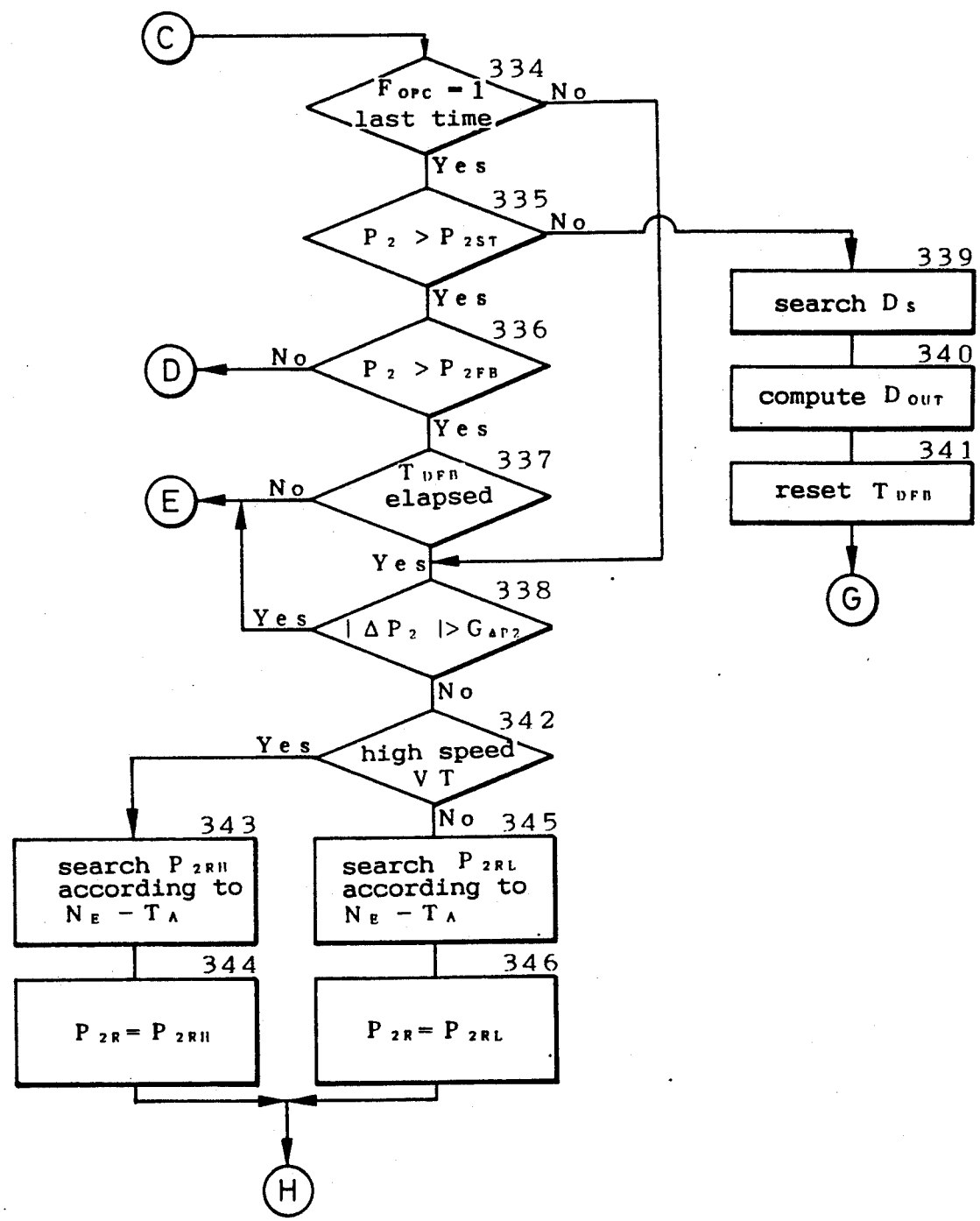
Figure 5D:
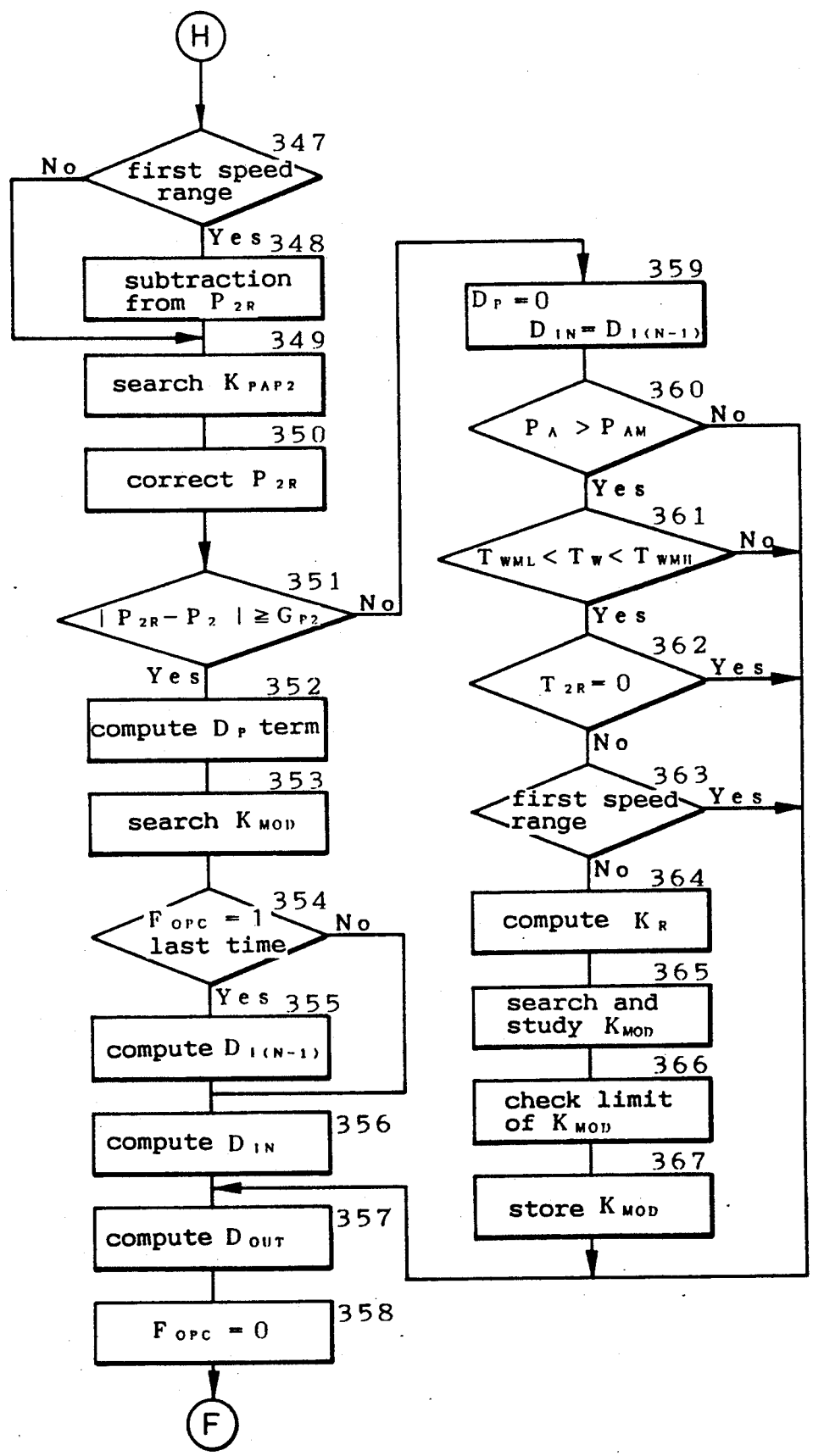
Figure 6:
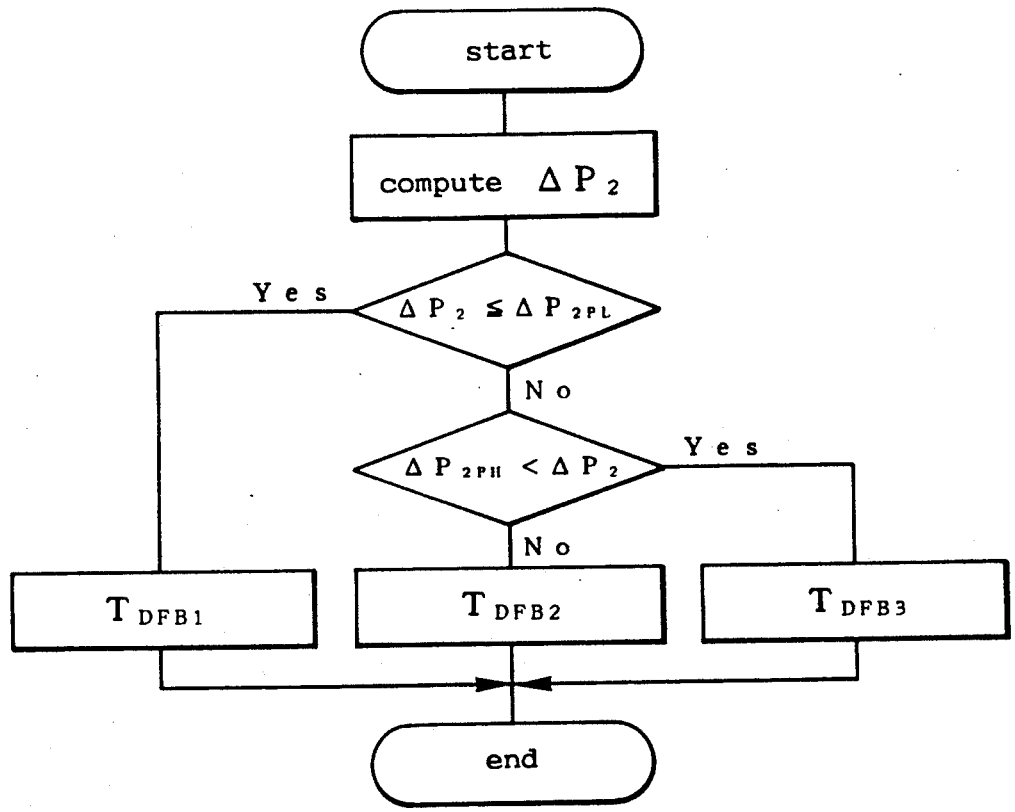

The feedback delay timer $T_{DFB}$ in the third step 303 is selected according to the subroutine given in FIG. 6. One of three timers $T_{DFB1}$, $T_{DFB2}$ and $T_{DFB3}$ is selected according to the change rate $\Delta P_2$ of the supercharge pressure $P_2$ which is given as a difference between the current supercharge pressure $P_{2N}$ and the supercharge pressure $P_{2N-6}$ of six cycles ago ($\Delta P_2 = P_{2N} - P_{2N-6}$). In other words, the main routine shown in FIGS. 5a through 5d obtains a difference in the values of supercharge pressure over six cycles to accurately determine the behavior of supercharge pressure or the change rate of supercharge pressure because only too small a change is produced in the change rate in supercharge pressure $\Delta P_2$ for each single TDC signal which renews the main routine given in FIGS. 5a through 5d. A low change rate $\Delta P_{2PL}$ and a high change rate $\Delta P_{2PH}$ are values determined according to the engine rotational speed $N_E$. If $\Delta P_2$ is equal to or less than $\Delta P_{2PL}$ the $T_{DFB1}$ is set up, if $\Delta P_2$ is larger than $\Delta P_{2PL}$ and equal to or less than $\Delta P_{2PH}$ the $T_{DFB2}$ is set up, and if $\Delta P_2$ is less than $\Delta P_{2PH}$ the $T_{DFB3}$ is set up. Further, the relationship $T_{DFB1} < T_{DFB2} < T_{DFB3}$ holds, and if the supercharge pressure change rate $\Delta P_2$ is found to be small or if the supercharge pressure $P_2$ changes gradually the delay time $T_{DFB}$ is selected to be small whereas if the supercharge pressure change rate $\Delta P_2$ is found to be large or if the supercharge pressure $P_2$ changes rapidly the delay time $T_{DFB}$ is selected to be large. In this way, it is made possible to prevent the occurrence of hunting when there is a transition from open loop control to feedback control by selecting a suitable delay time $T_{DFB}$ which is not too large or too small for the change rate in the load.

If it is determined in the first step 301 that no start mode is found, it is then determined in the sixth step 306 if a fail-safe condition exists or not. This is carried out by monitoring the results of self-diagnosis by the ECU and the CPU, and input signals from various sensors including the oil pressure switch signal $O_P$, indicating the operating condition of the coupling switch over device 51 for valve timing control, and, in case an abnormal condition should exist, the system flow advances to the second step 302. Otherwise, the system flow advances to the seventh step 307. A comparison is made in the seventh step 307 between an intake temperature $T_A$ and a prescribed low intake temperature $T_{AL}$. If $T_A$ is lower than $T_{AL}$ the system flow advances to the second step 302, but if $T_A$ is equal to or higher than $T_{AL}$ the system flow advances to the eighth step 308. A comparison is made in the eighth step 308 between a cooling water temperature $T_W$ and a prescribed low cooling water temperature $T_{WL}$. If $T_W$ is lower than $T_{WL}$ the system flow advances to the second step 302, but if $T_W$ is equal to or higher than $T_{WL}$ the system flow advances to the ninth step 309. A comparison is made in the ninth step 309 between an intake temperature $T_A$ and a prescribed high intake temperature $T_{AH}$. If $T_A$ is higher than $T_{AH}$ the system flow advances to the second step 302, but if $T_A$ is equal to or lower than $T_{AH}$ the system flow advances to the tenth step 310. A comparison is made in the tenth step 310 between the cooling water temperature $T_W$ and a prescribed high cooling water temperature $T_{WH}$. If $T_W$ is higher than $T_{WH}$ the system flow advances to the second step 302, but if $T_W$ is equal to or lower than $T_{WH}$ the system flow advances to the eleventh step 311. The current shift position of the transmission system is detected in the eleventh step 311, and the system flow advances to the second step 302 if a parking range P or a neutral range N is selected and otherwise advances to the twelfth step 312.

The above described flow may be summarized by that the cross sectional area of the flow passages between the fixed vanes 84 and the moveable vanes 87 is controlled to a maximum value without regards to any other factors if the vehicle is not running, the intake temperature $T_A$ or the cooling water temperature $T_W$ is outside a prescribed range or any abnormal condition exists in the control system. This measure is taken because in any of such cases it is obvious that the conditions for a stable operation of the engine are not met and introducing a supercharge pressure $P_2$ under such a circumstance will undoubtedly promote instability. At the same time, the valve timing switch over control program is executed in such a manner that valve time control is fixed to low speed valve timing control by setting the flag $F_{LVT}=1$ and the coupling switch over unit 51 is fixed to a condition for low speed valve timing.

If it is determined in the preceding steps that the engine is in a stable operating condition and the vehicle is running, it is determined in the twelfth step 312 if the shift position is in a first speed range or not. If not, the system flow advances to the fourteenth step 314 after setting the flag $F_{LVT}=0$ to indicate that an override condition for low speed valve timing operation is released in the thirteenth step 313. If the shift position is found to be in a first speed range, the system flow advances to the fourteenth step 314 after a subtraction process is carried out on the basic duty $D_M$ serving as a basic supercharge control variable in the fifteenth step 315 and, at the same time, the flag $F_{LVT}=1$ is set in the sixteenth step 316 to indicate the existence of an override condition for low speed valve timing operation.

Figure 7:
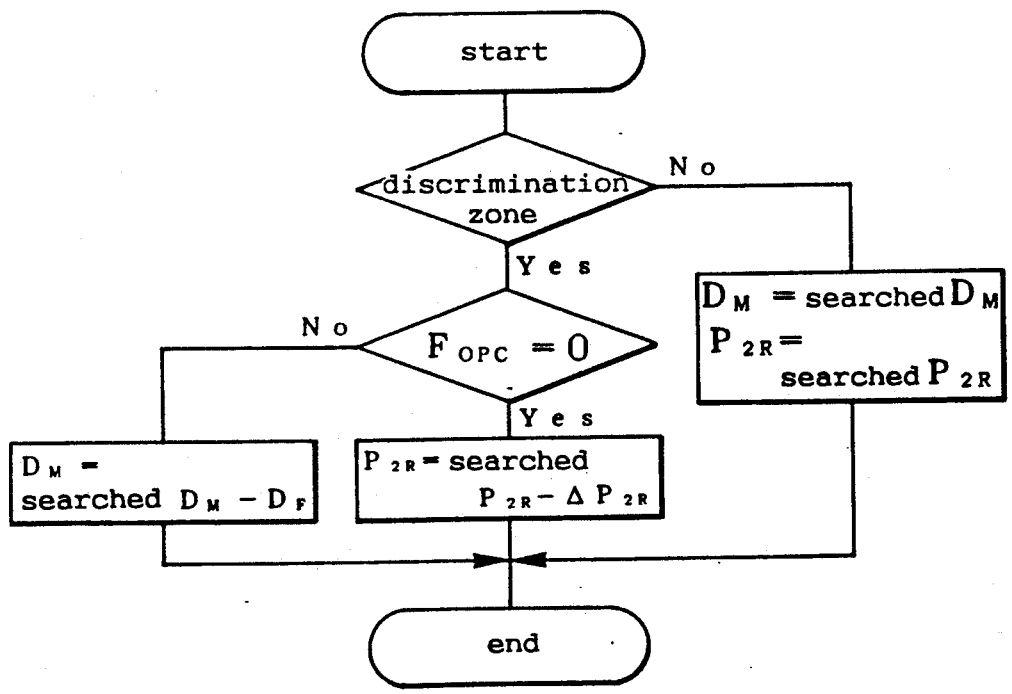

The basic duty $D_M$ is searched from a map as described hereinafter, and a subtraction operation on this $D_M$ is carried out in the fifteenth step 315 according to the subroutine shown in FIG. 7. In other words, a discrimination zone is defined in the operating condition of the engine as determined by the rotational speed of the engine $N_E$ and intake negative pressure $P_B$ as a zone in which a subtraction from the $D_M$ value is required, and it is determined whether a subtraction from the $D_M$ value should be carried out or not depending on whether the operating condition is located in this discrimination zone or not. The output torque of the engine can be determined from the rotational speed of the engine $N_E$ and the intake negative pressure $P_B$, but the boundary of the discrimination zone represents a permissible torque of the gear shafts in the first speed range, and this measure is taken in order to ensure that the force acting upon the gear shafts may not be excessive. If the operating condition is located outside of the discrimination zone or the permissible torque is not exceeded, the system flow advances to the next step without modifying the searched $D_M$ value. However, if the operating condition falls within the discrimination zone or the permissible torque has been exceeded, it is determined whether the flag indicating the condition of feedback control is zero or $F_{OPC}=0$ or not. If the condition of open loop control exists, a subtraction is carried out as given in the following to somewhat reduce the duty $D_{OUT}$ for the solenoid valve 34:

$$D_M = \text{searched } D_M - D_F$$

where $D_F$ is a predetermined subtraction constant. If the condition of feedback control exists, a subtraction is carried out as given in the following to somewhat reduce the target supercharge pressure $P_{2R}$:

$$P_{2R} = \text{searched } P_{2R} - \Delta P_{2R}$$

where $P_{2R}$ is a target supercharge pressure under the feedback control condition as determined by the rotational speed of the engine $N_E$ and the intake temperature $T_A$ and $\Delta P_{2R}$ is a predetermined subtraction constant.

The process described above produces a low speed valve timing condition and a relatively low supercharge pressure in order to prevent excessive torque output, for instance, in case of an abrupt start up in the first gear.

In the fourteenth step 314 it is determined whether the coupling switch over unit 51 is in the high speed valve timing condition or not. If the high speed valve timing condition is detected, the system flow advances to the seventeenth step 317 where a table $P_{2HGH}$ adapted for high speed valve timing is selected for determining a high supercharge pressure guard value $P_{2HG}$. If not, the system flow advances to the eighteenth step 318 where a table $P_{2HGL}$ adapted for low speed valve timing is selected for determining a high supercharge pressure guard value $P_{2HG}$. The high supercharge guard value $P_{2HG}$ is determined according to the rotational speed of the engine $N_E$ so as to obtain a maximum engine output while the durability of the engine is taken into consideration.

The discrimination whether the current valve timing is adapted for high speed or low speed operation is made according to the presence of a magnetization signal for the solenoid valve 16 in the control unit.

In the nineteenth step 319, a comparison is made between the current supercharge pressure $P_2$ and the high supercharge pressure guard value $P_{2HG}$ obtained from the table selected according to the current valve timing condition. If $P_2$ is found to be higher than $P_{2HG}$ or a condition of excessive supercharging is detected, a demand is made to the valve timing switch over control program to switch to low speed valve timing in the second step 302 and a control action is taken so as to reduce the supercharge pressure. Conversely, it $P_2$ is found to be lower than $P_{2HG}$, the system flow advances to the twentieth step 320 and it is determined again whether the high speed valve timing condition exists or not.

If the presence of the high speed valve timing condition is detected in the twentieth step 320, a basic duty $D_{MH}$ is searched from a map corresponding to high speed valve timing in the twenty-first step 321, and this value is defined as the $D_M$ value in the twenty-second step 322. If no high speed valve timing condition is detected, a basic duty $D_{ML}$ is searched from a map corresponding to low speed valve timing in the twenty-third step 323, and this value is defined as the $D_M$ value in the twenty-fourth step 324. The basic duty $D_M$ is determined from the rotational speed of the engine $N_E$ and the opening angle $\theta_{TH}$ of the throttle valve, and is searched from the entries of a table or a map corresponding to the current load condition.

It is thus possible to adapt the engine to various operating conditions including deceleration and transient operation conditions by preparing separate maps defined by engine rotational speed $N_E$ and throttle opening angle $\theta_{TH}$ for high speed valve timing and low speed valve timing and changing the mode of supercharge pressure control according to the condition of valve timing. Here, a throttle opening angle $\theta_{TH}$ was used as a parameter for indicating the load condition of the engine, but it may be replaced by intake negative pressure $P_B$ or the amount of fuel injection.

In the twenty-fifth step 325, a duty correction factor $K_{MOD}$, an atmospheric pressure duty correction factor $K_{PAD}$ (0.8 to 1.0), and an intake temperature duty correction factor $K_{TAD}$ (0.8 to 1.3) are searched. The duty correction factor $K_{MOD}$ is searched from a map of the rotational speed of the engine $N_E$ and the intake temperature $T_A$, and is updated by a studying process which is done when an optimum supercharge pressure $P_2$ has fallen within a certain range of deviation. The atmospheric pressure duty correction factor $K_{PAD}$ is determined according to the intake pressure $P_A$, and the intake temperature duty correction factor $K_{TAD}$ is determined according to the intake temperature $T_A$. The control process is thus adapted to external factors as required.

Figure 8:
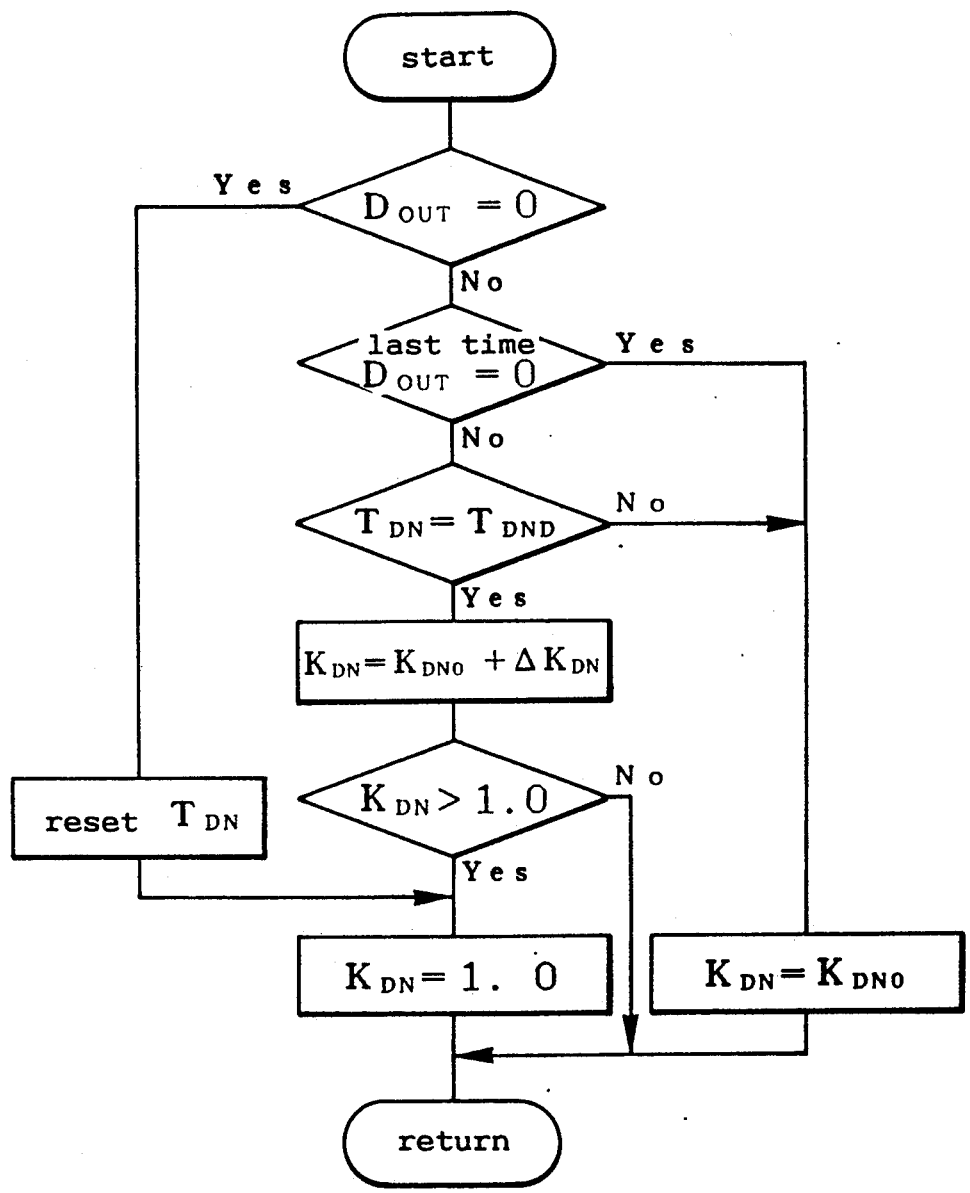

In the twenty-sixth step 326, a correction factor $K_{DN}$ is searched according to the subroutine given in FIG. 8. This subroutine is executed by interrupting the main routine shown in FIGS. 5a through 5d every time a TDC signal is produced. A timer $T_{DN}$ is reset when the duty $D_{OUT}$ is zero, and the correction factor $K_{DN}$ is set to an initial value $K_{DNO}$ (for instance 0.5) in response to the first TDC signal after the duty $D_{OUT}$ has ceased to be zero. After a certain time interval $T_{DNO}$ (for instance 5 seconds) set on the timer $T_{DN}$ has run out, $\Delta K_{DN}$ (for instance 0.01) is added to $K_{DN}$ every time a TDC signal is received so as to produce a new correction factor $K_{DN}$ each time, and the correction factor $K_{DN}$ is fixed to 1.0 after it has reached the value 1.0.

The correction factor $K_{DN}$ thus obtained is used in the correction formula for the duty $D_{OUT}$ which is described hereinafter so that the duty $D_{OUT}$ may be forced to zero in case a special operating conditions of the engine where the intake temperature $T_A$ is abnormally high or low, the cooling water temperature is abnormally high or low or the supercharge pressure $P_2$ is abnormally high, or, in other words, so that the duty $D_{OUT}$ may be controlled in a stable fashion when the condition in which the gaps between the fixed vanes and the moveable vanes are maximized is removed. When the operating condition has returned from a special condition in which $D_{OUT}=0$ to a normal operation condition, if the duty immediately returned to a normal value, an irregular control action might take place on the boundary between the special operating condition and the normal operating condition. Therefore, upon elapsing of, for instance, 5 seconds after the normal operating condition is restored, the correction factor $K_{DN}$ is incremented, for instance, by 0.1 every time a TDC signal is received, to gradually restore the duty $D_{OUT}$ to its normal value so that the occurrence of such an irregular control action may be avoided.

Then, in the twenty-seventh step 327, a comparison is made between the current throttle opening angle $\theta_{TH}$ and a predetermined reference throttle opening angle $\theta_{THFB}$ $\theta_{THFB}$. This reference throttle opening angle corresponds to a medium to high load operating condition of the engine, and is defined so as to permit a judgment of the need for a switch over from open loop control to feedback control. By using a throttle opening angle $\theta_{TH}$ as a judgment parameter, it becomes possible to make an accurate judgment on the need for supercharging under each particular operating condition. If $\theta_{TH}$ is equal to or less than $\theta_{THFB}$ or open loop control is to be continued, after resetting the feedback delay timer $T_{DFB}$ mentioned in conjunction with FIG. 6 (the third step) in the twenty-eighth step 328, the system flow advances to the twenty-ninth step 329. If $\theta_{TH}$ is determined to be larger than $\theta_{THFB}$ in the twenty-seventh step 327, it is then determined in the thirtieth step 330 whether the coupling switch over unit 51 is in low speed valve timing condition or not. If a low speed valve timing condition is detected, the system flow advances to the twenty-eighth step 328 because open loop control is to be continued. This measure is taken because of a need to depend on open loop control and achieve a higher tracking capability in view of the fact that, in low speed valve timing condition, transient conditions are normal and, furthermore, torque output is relatively small in absolute value.

Figure 9:
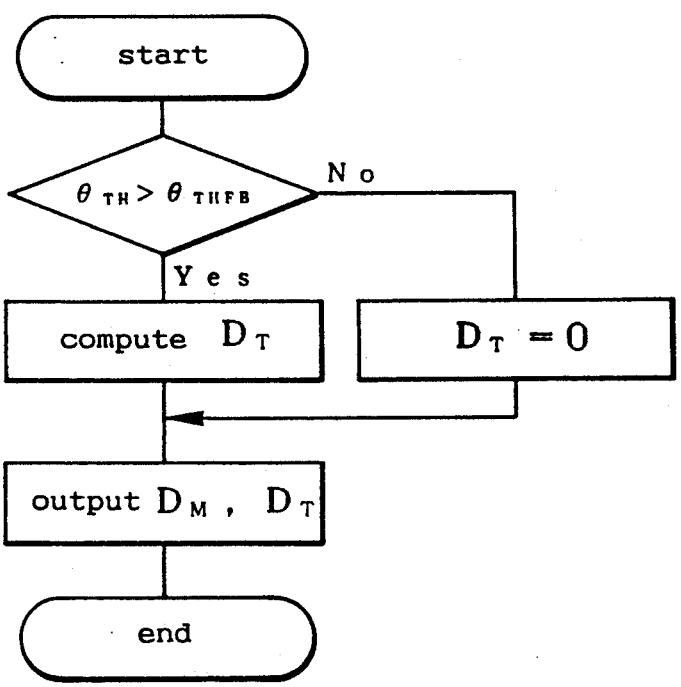

In the twenty-ninth step 329, a set-up subtraction duty $D_T$ and a set-up addition duty $D_{TRB}$ are searched. The set-up subtraction duty $D_T$ corresponds to the change rate $\Delta P_2$ of supercharge pressure $P_2$, and is determined by the subroutine given in FIG. 9. If $\theta_{TH}$ is larger than $\theta_{THFB}$ or in case of a medium to high load operating condition in which a transition from open loop control to feedback control takes place, the set-up subtraction duty $D_T$ which is set up according to a relationship between the supercharge pressure change rate $\Delta P_2$ and the rotational speed of the engine $N_E$ is selected. If $\theta_{TH}$ is equal to or less than $\theta_{THFB}$, no correction of the basic duty $D_M$ is made.

The set-up subtraction duty $D_T$ increases in a stepwise manner with an increase in the supercharge pressure change rate $\Delta P_2$, and can also change, for instance, in three steps, depending on the rotational speed of the engine $N_E$. Thus, the higher the rotational speed of the engine is, the larger the subtraction value becomes. This process is started immediately before the actual supercharge pressure reaches a target supercharge pressure $P_{2R}$ so that the transition from open loop control to feedback control may be carried out in a smooth fashion.

The set-up addition duty $D_{TRB}$ is determined according to the subroutine given in FIG. 10. When an open loop control condition exists ($F_{OPC}=1$) and the supercharge pressure change rate $\Delta P_2$ is negative, a set-up addition duty $D_{TRB}$ which is determined by $-\Delta P_2$ and the rotational speed of the engine $N_E$ is selected, and the set-up subtraction duty $D_T$ is made zero. When a feedback control condition exists ($F_{OPC}=0$) or the supercharge pressure change rate $\Delta P_2$ is positive, the set-up addition duty $D_{TRB}$ is made zero. This set-up addition duty $D_{TRB}$ is also changed depending on the values of the negative supercharge pressure change rate $-\Delta P_2$ and the rotational speed of the engine $N_E$, and becomes larger as the rotational speed $N_E$ of the engine is increased and the negative supercharge pressure change rate $-\Delta P_2$ is increased. Thus, reaction from the set-up subtraction duty $D_T$ is compensated for, and a stable supercharge pressure control is made possible.

After the various correction factors $K_{MOD}$, $K_{PAD}$, $K_{TAD}$ and $K_{DN}$, the set-up subtraction duty $D_T$ and the set-up addition duty $D_{TRB}$ are determined, the duty $D_{OUT}$ is corrected in the thirty-first step 331.

$$D_{OUT} = K_{MOD} \times K_{PAD} \times K_{TAD} \times K_{DN} \times (D_M + D_{TRB} - D_T)$$

Therefore, the output duty $D_{OUT}$ produced in the fifth step 305 reflects the overall operating condition of the engine by taking into account the above mentioned items and other external factors, and allows an optimum supercharge control to be automatically carried out according to the load condition.

Then, the flag $F_{OPC}$ is set to 1 in the thirty-second step 332 in order to indicate the existence of an open loop control condition, and the system flow advances to the thirty-third step 333. It is then determined in this step if the $D_{OUT}$ has not exceeded a certain limit value which is determined in advance according to the rotational speed of the engine $N_E$ or not, and if it is within the limit value, a duty $D_{OUT}$ is produced in the fifth step 305.

Meanwhile, if it is determined in the thirtieth step 330 that no low speed valve timing condition exists, the system flow advances to the thirty-fourth step 334 (FIG. 5c).

The flag of the previous cycle is determined in the thirty-fourth step 334. If $F_{OPC} = 1$ or an open loop control condition existed in the previous cycle, a comparison is made in the thirty-fifth step 335 between the current supercharge pressure $P_2$ and the duty control start discrimination supercharge pressure $P_{2ST}$. This duty control start discrimination supercharge pressure $P_{2ST}$ is given from the following equation:

$$P_{2ST} = P_{2R} - \Delta P_{2ST}$$

where $\Delta P_{2ST}$ is a subtraction value which is determined in advance according to the supercharge pressure change rate $\Delta P_2$ and the rotational speed of the engine $N_E$, and becomes larger as the engine rotational speed increases and as the supercharge pressure change rate $\Delta P_2$ becomes larger.

If $P_2$ is found to be larger than $P_{2ST}$ in the thirty-fifth step 335, a comparison is made in the thirty-sixth step 336 between the current supercharge pressure $P_2$ and the feedback control start discrimination supercharge pressure $P_{2FB}$. This feedback control start discrimination supercharge pressure $P_{2FB}$ is given from the following equation:

$$P_{2FB} = P_{2R} - \Delta P_{2FB}$$

where $\Delta P_{2FB}$ is also a subtraction value which is determined in advance according to the supercharge pressure change rate $\Delta P_2$ and the rotational speed of the engine $N_E$.

If $P_2$ is found to be larger than $P_{2FB}$, it is determined in the thirty-seventh step 337 whether the time set up on the feedback delay timer $T_{DFB}$ has run out of not, and if so the system flow advances to the thirty-eighth step 338.

If the flow $F_{OPC} = 0$ in the thirty-fourth step 334 or a feedback control condition existed in the previous cycle, the system flow advances to the thirty-eighth step 338. If $P_2$ is found to be equal to or less than $P_{2ST}$ in the thirty-fifth step, the system flow advances to the thirty-ninth step 339. If $P_2$ is found to be equal to or less than $P_{2FB}$ in the thirty-sixth step 336, the system flow advances to the twenty-eighth step 328. If the time set on the feedback delay timer $T_{DFB}$ has not run out in the thirty-seventh step 337, the system flow advances to the twenty-ninth step 329.

A set-up duty $D_S$ is searched in the thirty-ninth step 339, as an auxiliary basic supercharge pressure control variable which is predetermined according to the rotational speed of the engine $N_E$, and the duty $D_{OUT}$ is computed in the fortieth step 340 according to the following formula:

$$D_{OUT} = D_S \times K_{TAD} \times K_{PAD}$$

Then, after resetting the feedback delay timer $T_{DFB}$ in the forty-first step 341, the system flow advances to the thirty-third step 333.

The process leading to the fortieth step 340 is intended as a measure to obtain a stable supercharge pressure control in the operating range in which the supercharge pressure $P_2$ rises towards the target supercharge pressure $P_{2R}$, and occurrence of overshoots can be avoided irrespective of the supercharge pressure change rate $\Delta P_2$ by determining the output duty $D_{OUT}$ according to the duty $D_S$ which was predetermined according to the rotational speed of the engine $N_E$.

In the thirty-eighth step 338, a comparison is made between the absolute value of the supercharge pressure change rate $\Delta P_2$ and the feedback control discrimination supercharge pressure difference $G_{\Delta P2}$. This $G_{\Delta P2}$ is set, for instance, at 30 mmHg, and if the absolute value of the supercharge pressure change rate $\Delta P_2$ is larger than $G_{\Delta P2}$ the system flow advances to the twenty-ninth step 329. If the absolute value of the supercharge pressure change rate $\Delta P_2$ is equal to or less than $G_{\Delta P2}$ the system flow advances to the forty-second step 342. Thus, if the absolute value of the supercharge pressure change rate $\Delta P_2$ is larger than $G_{\Delta P2}$ or, in other words, if the supercharge rate $\Delta P_2$ is sharper than a prescribed limit when a feedback control is about to be started, as hunting could occur, the system flow returns to the twenty-ninth step 329 to carry out an open loop control.

It is determined in the forty-second step 342 whether the coupling switch over unit 51 is adapted for high speed valve timing or not. If a high speed valve timing condition is detected, a target supercharge pressure $P_{2RH}$ for high speed valve timing is searched in the forty-fourth step 344 according to the rotational speed of the engine $N_E$ and the intake temperature $T_A$, and this $P_{2RH}$ is set as a target supercharge pressure $P_{2R}$. If absence of a high speed vale timing condition is detected, a target supercharge pressure $P_{2RL}$ for low speed valve timing is searched in the forty-fifth step 345, and this $P_{2RL}$ is set as a target supercharge pressure $P_{2R}$. This measure is taken in view of the fact that the intake volume efficiency changes according to valve timing or the amount of valve opening in order to maximize the engine output in a most efficient manner by changing the setting of the target supercharge pressure $P_{2R}$ according to the selected valve timing.

It is then determined in the forty-seventh step 347 if the first speed range is selected on the automatic transmission system or not. If the first speed range is detected and if it is found that the operating condition falls within a prescribed discrimination zone in the forty-eighth step 348 according to the subroutine shown in FIG. 7, the system flow advances to the forty-ninth step 349 after carrying out the following subtraction:

$$P_{2R} = \text{searched } P_{2R} - \Delta P_{2R}$$

where $\Delta P_{2R}$ is a subtraction value which is set up in response to the first range condition of the automatic transmission system. If the shift position is found to be other than the first speed range in the forty-sixth step, the system flow advances to the forty-ninth step 349 without carrying out any subtraction from the target supercharge pressure $P_{2R}$.

A prescribed supercharge atmospheric pressure correction factor $K_{PAP2}$ is searched in the forty-ninth step 349 according to the atmospheric pressure $P_A$, and correction of the target supercharge pressure $P_{2R}$ is made by carrying out the following arithmetic operation in the fiftieth step 350:

$$\text{corrected } P_{2R} = \text{searched } P_{2R} \times K_{PAP2} \times K_{RTB}$$

where $K_{RTB}$ is a correction factor to account for a knock condition of the engine.

It is determined in the fifty-first step 351 whether the absolute value of the difference between the target supercharge pressure $P_{2R}$ and the current supercharge pressure $P_2$ is equal to or larger than a predetermined value $G_{P2}$ which is given as a dead zone in the feedback control and may be selected at 20 mmHg, for instance. If the absolute value of the difference between the target supercharge pressure $P_{2R}$ and the current supercharge pressure $P_2$ is equal to or larger than the predetermined value $G_{P2}$, the system flow advances to the fifty-second step 352 where a proportional control term $D_P$ is computed according to the following formula:

$$D_P = K_p \times (P_{2R} - P_2)$$

Figure 11:
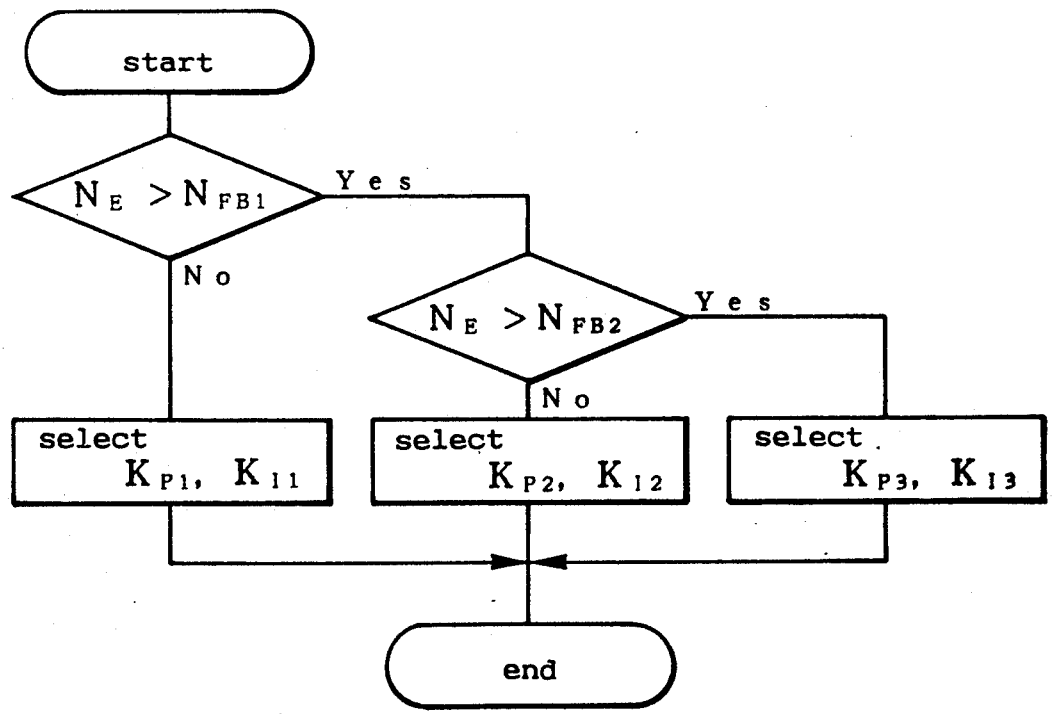

In the above formula, $K_p$ is the proportional control term in a feedback factor, and is determined according to the subroutine given in FIG. 11. In FIG. 11, if the rotational speed of the engine $N_E$ is equal to or lower than a first switch over rotational speed $N_{FB1}$, a feedback coefficient $K_{11}$ related to an integration control term which is described hereinafter is selected along with $K_{P1}$. If the rotational speed of the engine $N_E$ is higher than the first switch over rotational speed $N_{FB1}$ but equal to or lower than a second switch over rotational speed $N_{FB2}$, $K_{P2}$ and $K_{12}$ are selected. If the rotational speed of the engine $N_E$ is higher than the second switch over rotational speed $N_{FB2}$, $K_{P13}$ and $K_{13}$ are selected.

In the fifty-third step 353, a correction coefficient $K_{MOD}$ associated with the current rotational speed of the engine $N_E$ and intake temperature $T_A$ is searched, and it is determined in the fifty-fourth step 354 if the flag $F_{OPC}$ was equal to 1 in the previous cycle or not, or, in other words, if the current feedback condition was produced for the first time or not. If $F_{OPC} = 1$ or if an open loop control condition existed in the previous cycle, the integration control term $D_{I(N-1)}$ of the previous cycle is computed in the fifty-fifth step 355 according to the following formula:

$$D_{I(N-1)} = K_{TAD} \times K_{PAD} \times D_M \times (K_{MOD} - 1)$$

Upon completion of this computing process, the system flow advances to the fifty-sixth step 356. However, if $F_{OPC} = 0$ or if no open loop control condition was detected in the fifty-fourth step 354, after circumventing the fifty-fifth step 355, the system flow advances to the fifty-sixth step 356 and a current integration control term $D_{IN}$ is computed according to the following formula:

$$D_{I(N)} = D_{I(N-1)} + K_1 + (P_{2R} - P_2)$$

Thereafter, in the fifty-seventh step 357, the duty $D_{OUT}$ is computed or the following arithmetic operation is carried out:

$$D_{OUT} = K_{TAD} \times K_{PAD} \times K_{DM} \times D_M + D_P + D_{IN}$$

Then, after setting the flag $F_{OPC} = 0$ in the fifty-eighth step 358, the system flow advances to the fifty-third step 333.

On the other hand, if the absolute value of $P_2$ is determined to be less than $G_{P2}$, the proportional control term $D_P = 0$ and the integration control term $D_{IN} = D_{I(N-1)}$ are set up in the fifty-ninth step 359. In the sixtieth step 360, it is determined whether the atmospheric pressure $P_A$ is higher than a predetermined reference atmospheric pressure $P_{AM}$ (for instance 650 mmHg) or not. In the sixty-first step 361, it is determined whether the water temperature $T_W$ is within a certain predetermined range or not. In the sixty-second step 362, it is determined whether the amount of retardation $T_{2R}$ is zero or not or if a knock condition is being avoided or not. In the sixty-third step 336, it is determined whether the shift position is other than the first speed range or not. If all these conditions are met the system flow advances to the fifty-fourth step 354 but if any of the conditions is not met the system flow advances to the fifty-seventh step 357.

A coefficient $K_R$ for a studying process related to the duty correction factor $K_{MOD}$ is computed in the sixty-fourth step 364 according to the following formula:

$$K_R = (K_{TAD} \times D_M + D_{IN}) / (K_{TAD} \times D_M)$$

Then, in the sixty-fifth step 365, to search for the correction factor $K_{MOD}$ and carry out a studying process, the following arithmetic operation is carried out:

$$K_{MOD} = (C_{MOD} \times K_R)/65536 + (65536 - C_{MOD}) \times K_{MOD}/65536$$

After checking the limit of this $K_{MOD}$ in the sixty-sixth step 366, the correction factor $K_{MOD}$ is stored in a backup RAM and the system flow advances to the fifty-seventh step 357.

The sixty-second through sixty-seventh steps 362 through 367 are included for the purpose of avoiding any possible ill effects on the operating condition of the engine by prohibiting the storage of the $K_{MOD}$ in case of special operating conditions in storing the results of the studying process during the time the supercharge pressure $P_2$ is controlled in a stable fashion by virtue of the dead zone $G_{P2}$.

It is thus advantageous to rely on open loop control which offers a fast response in low to medium speed range where operating conditions tend to change rapidly and transient conditions are frequently produced. On the other hand, in high speed range, since a fast response is not so crucial, a stable and accurate feedback control may be used without any ill effects.

A blow-back of intake can be controlled and a relatively high volume efficiency can be obtained in a low speed operating range of an engine if at least either the angular interval of opening the valves or the valve lift is selected to be small. On the other hand, it is desirable to increase at least one of the valve opening angular interval and the valve lift in a high speed operating range of an engine in view of obtaining a required amount of intake. In other words, the output property of the engine in relation with its rotational speed is dictated by the profiles of the cams. Therefore, two sets of different output properties can be combined into a signal engine if the valves actuated by the engine are provided with two interchangeable different cam profiles.

Meanwhile, as opposed to a natural aspiration engine in which intake is drawn into its combustion chambers solely by the negative pressure produced by the reciprocating movement of its pistons, a supercharged engine increases its output by pressurizing the intake above the atmospheric pressure as it is introduced into the combustion chambers and by thus increasing the effective volume which is displaced by the pistons. The upper limit of the supercharge pressure of any particular engine is determined typically according to the design considerations on combustion efficiency and mechanical durability of the particular engine. Therefore, in such an engine as described above which combines a valve operating condition switch over unit and a variable capacity supercharger are combined, it is necessary to carry out supercharge pressure control in two different modes for two different output properties of the engine.

Therefore, according to the present invention, by preparing a plurality of sets of maps for searching a basic supercharge pressure control variable $D_M$ for carrying out duty control and a target supercharge pressure set up value $P_{2R}$ for feedback control depending on the differences in the operating conditions of the intake valves and the exhaust valves, and by switching over these maps in response to the switch over signals for the operation of the valves, an optimum control performance adapted to each particular operating condition can be achieved.

In particular, if supercharge pressure is required to be boosted in a high speed range, supercharge efficiency is even further improved due to the increase in the amount of valve opening. If the supercharge pressure may be reduced in a high speed range by virtue of the gain in the output due to the change in valve timing, the compression ratio can be reduced while a sufficient output can be obtained.

Thus, according to the present invention, since supercharge pressure control can be carried out in response to the switch over in valve timing, engine output can be increased over an even broader operating range. Particularly since the supercharge pressure in a high speed range can be reduced without reducing engine output, the knock limit can be raised through lower combustion temperature and the burden on the engine can be reduced with the result that the improvements in both engine output and engine durability can be achieved at the same time.

To eliminate the dip in the engine output resulting from the change in the conditions of the intake passage due to the existence of regions near a point of step-wise switch over of the valve actuating mechanism, upon detection of a negative supercharge pressure change rate $\Delta P_2$ or any dip in engine output torque is detected, a set-up addition duty $D_{TRB}$ searched in the twenty-ninth step 329 is automatically added to the basic duty $D_M$ to compensate for such a dip.

In the steps 306 through 312, under certain conditions, the supercharge capacity and valve timing were fixed to a large capacity and low speed conditions, respectively. The following are the reasons behind these operations:

1. When the engine is being cranked, the rotational speed of the engine is inevitably unstable, and adjusting valve timing or a supercharge capacity under such a circumstance will lead to an unstable operation of the engine. Therefore, it is preferable to fix valve timing to low speed condition which reduces the possibility of intake blow-back and a supercharge capacity to a large capacity level which presents less flow resistance to intake.

2. Should any abnormal condition arise in the control system, there is a good chance that the valve timing switch over and the capacity varying action for the supercharger is not carried out as desired. In such a case, low speed condition and a large capacity condition should be selected for the valve actuating mechanism and the supercharger as a fail-safe measure.

3. When the intake or the cooling water is excessively cold, the density of the intake becomes high and the resulting tendency for over-supercharging may be detrimental to the durability of the engine. Also, a high viscosity of lubricating oil may prevent satisfactory switch over action of the valve actuating mechanism. Therefore, in this case also, low speed condition and a large capacity condition are desirable for the valve actuating mechanism and the supercharger, respectively.

4. When the intake or the cooling water is excessively high, the magnetic property of the solenoids of the solenoid valves may be adversely affected by the high temperature, and the control accuracy may be doubtful. At the same time, a high temperature tends to cause detonation and other irregular combustions and lower the knock limit. Therefore, in this case also, low speed condition and a large capacity condition are desirable in view of the durability of the engine.

5. When supercharging is carried out and/or a high speed valve timing condition is selected in the first speed range of the transmission system, an excessive large torque may be transmitted through the transmission system of the vehicle. Therefore, again, low speed condition and a large capacity condition are desirable in view of the durability of the engine.

What we claim is:

1. An engine control system, comprising:
 a variable valve actuating mechanism for actuating at least two intake valves of an internal combustion engine, said mechanism being provided with valve actuating condition varying means for varying at least an open period of said intake valves between a high speed mode and a low speed mode in such a manner that said intake valves open earlier and close later in said high speed mode than in said low speed mode;
 a supercharger for supplying supercharged intake air to said internal combustion engine, said supercharger being provided with capacity varying means for varying a supercharge pressure output of said supercharger;

detecting means for detecting an engine operating condition including at least a rotational speed of said engine; and control means for supplying control signals to said valve actuating condition varying means and said capacity varying means according to an output from said detecting means;

said control means supplying a supercharger control signal to said capacity varying means so that said supercharge pressure output may be increased by a certain increment when said control means supplies a valve actuating control signal to said valve actuating condition varying means so as to switch over said valve actuating mechanism from said low speed mode to said high speed mode.

2. An engine control system according to claim 1, wherein said control means controls said capacity varying means as a closed-loop control process, and increases said supercharge pressure output by a certain increment by raising a target value of said closed-loop control process.

3. An engine control system according to claim 1, wherein said detecting means detects an intake temperature of said internal combustion engine and a supercharge pressure of said supercharger as well as a rotational speed of said engine.

4. An engine control system according to claim 1, wherein said detecting means further detects a throttle opening of said engine.

5. An engine control system according to claim 1, wherein said control means supplies a supercharge control signal to said capacity varying means so that said supercharge pressure output may be decreased by a certain increment when said control means supplies a valve actuating control signal to said valve actuating condition varying means so as to switch over said valve actuating mechanism from said high speed mode to said low speed mode.

6. An engine control system according to claim 5, wherein said detecting means further detects a throttle opening of said engine, and said control means supplies said supercharger control signal to increase said supercharge pressure by said increment only when said throttle opening detected by said detecting means is greater than a prescribed value.

7. An engine control system according to claim 1, further comprising means for detecting a change rate of a supercharge pressure output of said supercharger, a control parameter of said closed-loop control process being varied depending on a detected level of the change rate of said supercharge pressure.

* * * * *